United States Patent
Saggar et al.

(10) Patent No.: US 12,556,351 B2
(45) Date of Patent: Feb. 17, 2026

(54) FULL DUPLEX BEAM PAIR SELECTION FOR SIDELINK COMMUNICATIONS

(71) Applicant: QUALCOMM Incorporated, San Diego, CA (US)

(72) Inventors: Hemant Saggar, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 18/167,532

(22) Filed: Feb. 10, 2023

(65) Prior Publication Data

US 2024/0275568 A1    Aug. 15, 2024

(51) Int. Cl.
| | |
|---|---|
| *H04L 5/14* | (2006.01) |
| *H04L 5/00* | (2006.01) |
| *H04W 72/044* | (2023.01) |
| *H04W 72/25* | (2023.01) |
| *H04W 72/54* | (2023.01) |

(52) U.S. Cl.
CPC ............. *H04L 5/14* (2013.01); *H04L 5/0048* (2013.01); *H04W 72/046* (2013.01); *H04W 72/25* (2023.01); *H04W 72/54* (2023.01)

(58) Field of Classification Search
CPC ...... H04L 5/14; H04L 5/0048; H04W 72/046; H04W 72/25; H04W 72/54; H04W 92/18; H04B 7/0696
See application file for complete search history.

(56) References Cited

U.S. PATENT DOCUMENTS

| | | | | |
|---|---|---|---|---|
| 2021/0135714 A1* | 5/2021 | Pezeshki | .............. | H04B 7/0695 |
| 2021/0376905 A1* | 12/2021 | Zhou | .................. | H04W 72/046 |
| 2021/0385057 A1* | 12/2021 | Zhou | ...................... | H04B 7/088 |
| 2022/0069884 A1* | 3/2022 | Zhang | ................... | H04W 76/11 |
| 2023/0370143 A1* | 11/2023 | Jamwal | ................. | H04W 24/08 |
| 2024/0007167 A1* | 1/2024 | Wu | ...................... | H04B 7/0632 |

FOREIGN PATENT DOCUMENTS

WO    2022174386 A1    8/2022

OTHER PUBLICATIONS

International Search Report and Written Opinion—PCT/US2023/084370—ISA/EPO—Apr. 10, 2024.

* cited by examiner

*Primary Examiner* — Abdullahi Ahmed
(74) *Attorney, Agent, or Firm* — Harrity & Harrity, LLP

(57) ABSTRACT

Various aspects of the present disclosure generally relate to wireless communication. In some aspects, a first user equipment (UE) may transmit, to a second UE, reference signals using transmit (Tx) beams of the first UE based at least in part on a Tx beam sweeping, wherein self-interference measurements associated with the first UE are based at least in part on the reference signals. The first UE may transmit, to the second UE, an indication of candidate full duplex Tx-Rx beam pairs, wherein the candidate full duplex Tx-Rx beam pairs are based at least in part on the self-interference measurements. The first UE may receive, from the second UE, an indication of a full duplex Tx-Rx beam pair selection from the candidate full duplex Tx-Rx beam pairs. Numerous other aspects are described.

30 Claims, 18 Drawing Sheets

FULL DUPLEX BEAM PAIR SELECTION FOR SIDELINK COMMUNICATIONS

FIELD OF THE DISCLOSURE

Aspects of the present disclosure generally relate to wireless communication and to techniques and apparatuses for full duplex beam pair selection for sidelink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first user equipment (UE) for wireless communication. The first UE may include memory, one or more processors coupled to the memory, and instructions stored in the memory and executable by the one or more processors. The instructions may be executable by the one or more processors to cause the first UE to transmit, to a second UE, reference signals using transmit (Tx) beams of the first UE based at least in part on a Tx beam sweeping, wherein self-interference measurements associated with the first UE are based at least in part on the reference signals. The instructions may be executable by the one or more processors to cause the first UE to transmit, to the second UE, an indication of candidate full duplex transmit-receive (Tx-Rx) beam pairs, wherein the candidate full duplex Tx-Rx beam pairs are based at least in part on the self-interference measurements. The instructions may be executable by the one or more processors to cause the first UE to receive, from the second UE, an indication of a full duplex Tx-Rx beam pair selection from the candidate full duplex Tx-Rx beam pairs.

Some aspects described herein relate to a second UE for wireless communication. The second UE may include memory, one or more processors coupled to the memory, and instructions stored in the memory and executable by the one or more processors. The instructions may be executable by the one or more processors to cause the second UE to receive, from a first UE, an indication of candidate full duplex Tx-Rx beam pairs. The instructions may be executable by the one or more processors to cause the second UE to transmit, to the first UE, reference signals using Tx beams of the second UE, from the candidate full duplex Tx-Rx beam pairs, wherein self-interference measurements associated with the second UE are based at least in part on the reference signals. The instructions may be executable by the one or more processors to cause the second UE to transmit, to the first UE, an indication of a full duplex Tx-Rx beam pair selection from the candidate full duplex Tx-Rx beam pairs, wherein the full duplex Tx-Rx beam pair selection is based at least in part on the self-interference measurements associated with the second UE.

Some aspects described herein relate to a method of wireless communication performed by a first UE. The method may include transmitting, to a second UE, reference signals using Tx beams of the first UE based at least in part on a Tx beam sweeping, wherein self-interference measurements associated with the first UE are based at least in part on the reference signals. The method may include transmitting, to the second UE, an indication of candidate full duplex Tx-Rx beam pairs, wherein the candidate full duplex Tx-Rx beam pairs are based at least in part on the self-interference measurements. The method may include receiving, from the second UE, an indication of a full duplex Tx-Rx beam pair selection from the candidate full duplex Tx-Rx beam pairs.

Some aspects described herein relate to a method of wireless communication performed by a second UE. The method may include receiving, from a first UE, an indication of candidate full duplex Tx-Rx beam pairs. The method may include transmitting, to the first UE, reference signals using Tx beams of the second UE, from the candidate full duplex Tx-Rx beam pairs, wherein self-interference measurements associated with the second UE are based at least in part on the reference signals. The method may include transmitting, to the first UE, an indication of a full duplex Tx-Rx beam pair selection from the candidate full duplex Tx-Rx beam pairs, wherein the full duplex Tx-Rx beam pair selection is based at least in part on the self-interference measurements associated with the second UE.

Some aspects described herein relate to a non-transitory computer-readable medium that stores one or more instructions for wireless communication by a first UE. The one or more instructions, when executed by one or more processors of the first UE, may cause the first UE to transmit, to a second UE, reference signals using Tx beams of the first UE based at least in part on a Tx beam sweeping, wherein self-interference measurements associated with the first UE are based at least in part on the reference signals. The one or more instructions, when executed by one or more processors of the first UE, may cause the first UE to transmit, to the second UE, an indication of candidate full duplex Tx-Rx beam pairs, wherein the candidate full duplex Tx-Rx beam pairs are based at least in part on the self-interference measurements. The one or more instructions, when executed by one or more processors of the first UE, may cause the first UE to receive, from the second UE, an indication of a full duplex Tx-Rx beam pair selection from the candidate full duplex Tx-Rx beam pairs.

Some aspects described herein relate to a non-transitory computer-readable medium that stores one or more instructions for wireless communication by a second UE. The one or more instructions, when executed by one or more processors of the second UE, may cause the second UE to receive, from a first UE, an indication of candidate full duplex Tx-Rx beam pairs. The one or more instructions, when executed by one or more processors of the second UE, may cause the second UE to transmit, to the first UE, reference signals using Tx beams of the second UE, from the candidate full duplex Tx-Rx beam pairs, wherein self-interference measurements associated with the second UE are based at least in part on the reference signals. The one or more instructions, when executed by one or more processors of the second UE, may cause the second UE to transmit, to the first UE, an indication of a full duplex Tx-Rx beam pair selection from the candidate full duplex Tx-Rx beam pairs, wherein the full duplex Tx-Rx beam pair selection is based at least in part on the self-interference measurements associated with the second UE.

Some aspects described herein relate to a first apparatus for wireless communication. The first apparatus may include memory, one or more processors coupled to the memory, and instructions stored in the memory and executable by the one or more processors. The first apparatus may include means for transmitting, to a second apparatus, reference signals using Tx beams of the first apparatus based at least in part on a Tx beam sweeping, wherein self-interference measurements associated with the first apparatus are based at least in part on the reference signals. The first apparatus may include means for transmitting, to the second apparatus, an indication of candidate full duplex Tx-Rx beam pairs, wherein the candidate full duplex Tx-Rx beam pairs are based at least in part on the self-interference measurements. The first apparatus may include means for receiving, from the second apparatus, an indication of a full duplex Tx-Rx beam pair selection from the candidate full duplex Tx-Rx beam pairs.

Some aspects described herein relate to a second apparatus for wireless communication. The second apparatus may include memory, one or more processors coupled to the memory, and instructions stored in the memory and executable by the one or more processors. The second apparatus may include means for receiving, from a first apparatus, an indication of candidate full duplex Tx-Rx beam pairs. The second apparatus may include means for transmitting, to the first apparatus, reference signals using Tx beams of the second apparatus, from the candidate full duplex Tx-Rx beam pairs, wherein self-interference measurements associated with the second apparatus are based at least in part on the reference signals. The second apparatus may include means for transmitting, to the first apparatus, an indication of a full duplex Tx-Rx beam pair selection from the candidate full duplex Tx-Rx beam pairs, wherein the full duplex Tx-Rx beam pair selection is based at least in part on the self-interference measurements associated with the second apparatus.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effec

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
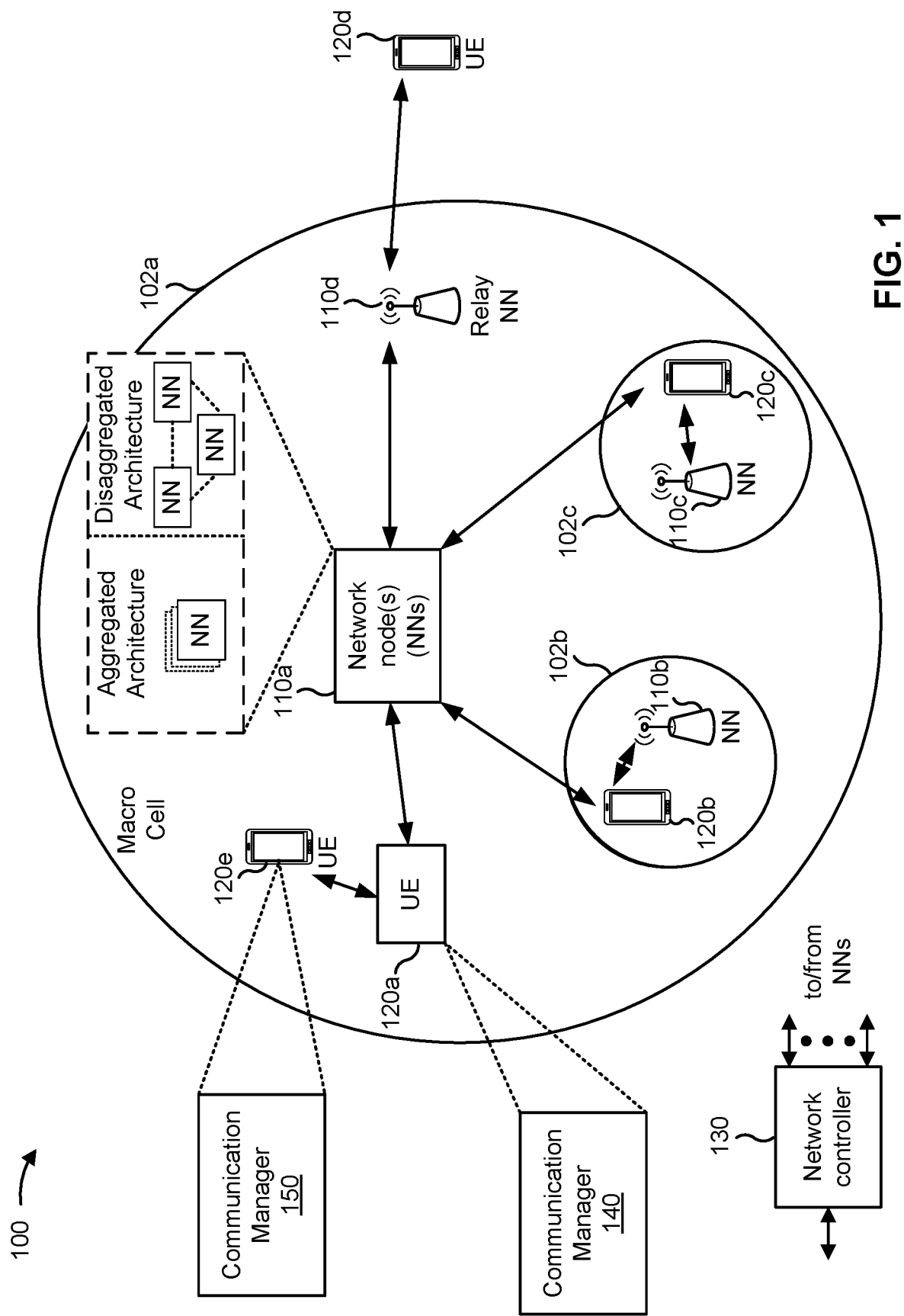
- FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first UE (e.g., UE 120a) may include a communication manager 140. As described in more detail elsewhere herein, the communication manager 140 may transmit, to a second UE, reference signals using transmit (Tx) beams of the first UE based at least in part on a Tx beam sweeping, wherein self-interference measurements associated with the first UE are based at least in part on the reference signals; transmit, to the second UE, an indication of candidate full duplex transmit-receive (Tx-Rx) beam pairs, wherein the candidate full duplex Tx-Rx beam pairs are based at least in part on the self-interference measurements; and receive, from the second UE, an indication of a full duplex Tx-Rx beam pair selection from the candidate full duplex Tx-Rx beam pairs. Additionally, or alternatively, the communication manager 140 may perform one or more other operations described herein.

In some aspects, a second UE (e.g., UE 120e) may include a communication manager 150. As described in more detail elsewhere herein, the communication manager 150 may receive, from a first UE, an indication of candidate full duplex Tx-Rx beam pairs; transmit, to the first UE, reference signals using Tx beams of the second UE, from the candidate full duplex Tx-Rx beam pairs, wherein self-interference measurements associated with the second UE are based at least in part on the reference signals; and transmit, to the first UE, an indication of a full duplex Tx-Rx beam pair selection from the candidate full duplex Tx-Rx beam pairs, wherein the full duplex Tx-Rx beam pair selection is based at least in part on the self-interference measurements associated with the second UE. Additionally, or alternatively, the communication manager 140 may perform one or more other operations described herein.

As indicated above, FIG. 1 is provided as an example. Other examples may differ from what is described with regard to FIG. 1.

Figure 2:
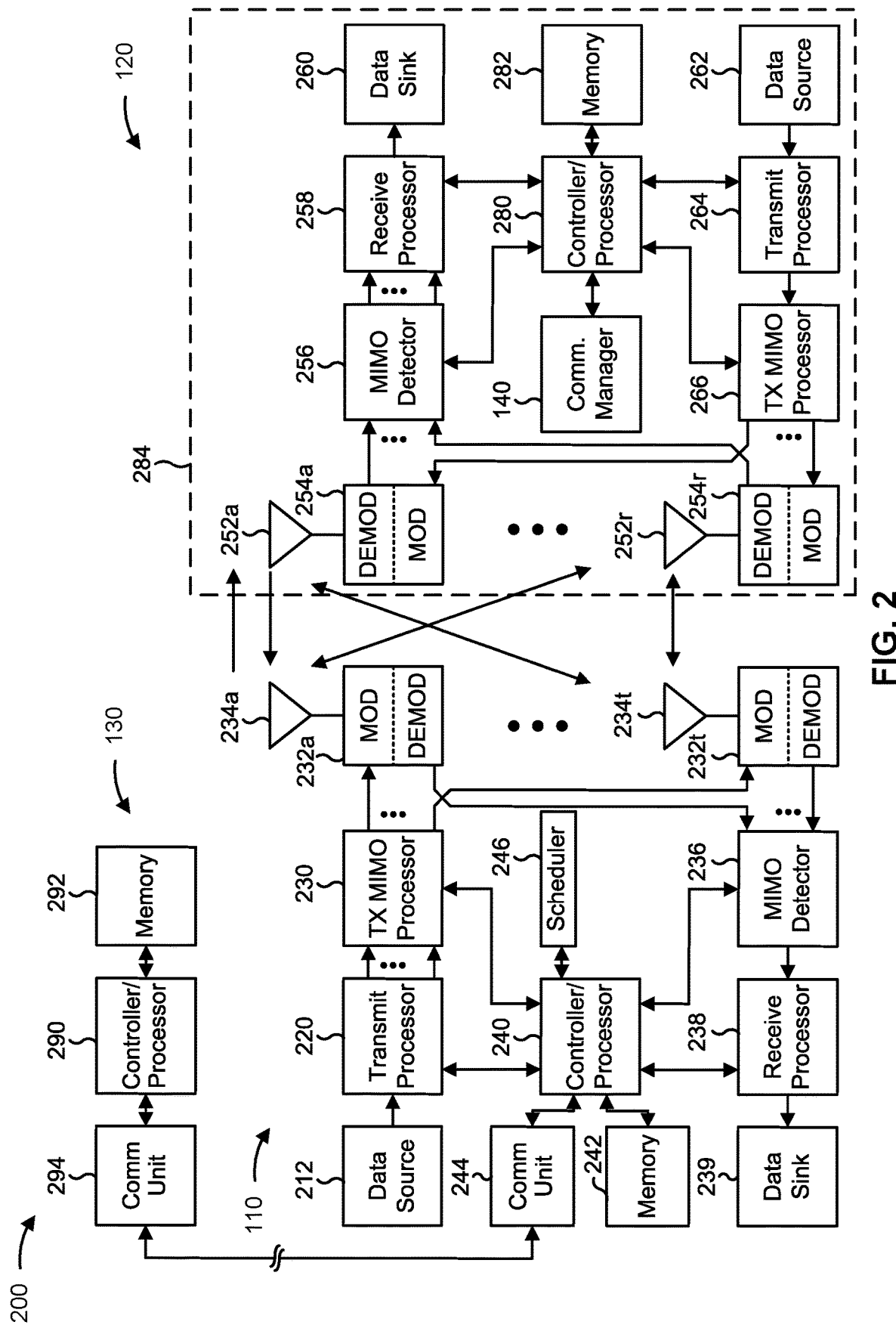
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-18).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-18).

The controller/processor 240 of the network node 110, the controller/processor 280 of the UE 120, and/or any other component(s) of FIG. 2 may perform one or more techniques associated with full duplex beam pair selection for sidelink communications, as described in more detail elsewhere herein. For example, the controller/processor 240 of the network node 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, a first UE (e.g., UE 120a) includes means for transmitting, to a second UE, reference signals using Tx beams of the first UE based at least in part on a Tx beam sweeping, wherein self-interference measurements associated with the first UE are based at least in part on the reference signals; means for transmitting, to the second UE, an indication of candidate full duplex Tx-Rx beam pairs, wherein the candidate full duplex Tx-Rx beam pairs are based at least in part on the self-interference measurements; and/or means for receiving, from the second UE, an indication of a full duplex Tx-Rx beam pair selection from the candidate full duplex Tx-Rx beam pairs. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second UE (e.g., UE 120*e*) includes means for receiving, from a first UE, an indication of candidate full duplex Tx-Rx beam pairs; means for transmitting, to the first UE, reference signals using Tx beams of the second UE, from the candidate full duplex Tx-Rx beam pairs, wherein self-interference measurements associated with the second UE are based at least in part on the reference signals; and/or means for transmitting, to the first UE, an indication of a full duplex Tx-Rx beam pair selection from the candidate full duplex Tx-Rx beam pairs, wherein the full duplex Tx-Rx beam pair selection is based at least in part on the self-interference measurements associated with the second UE. The means for the second UE to perform operations described herein may include, for example, one or more of communication manager 150, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
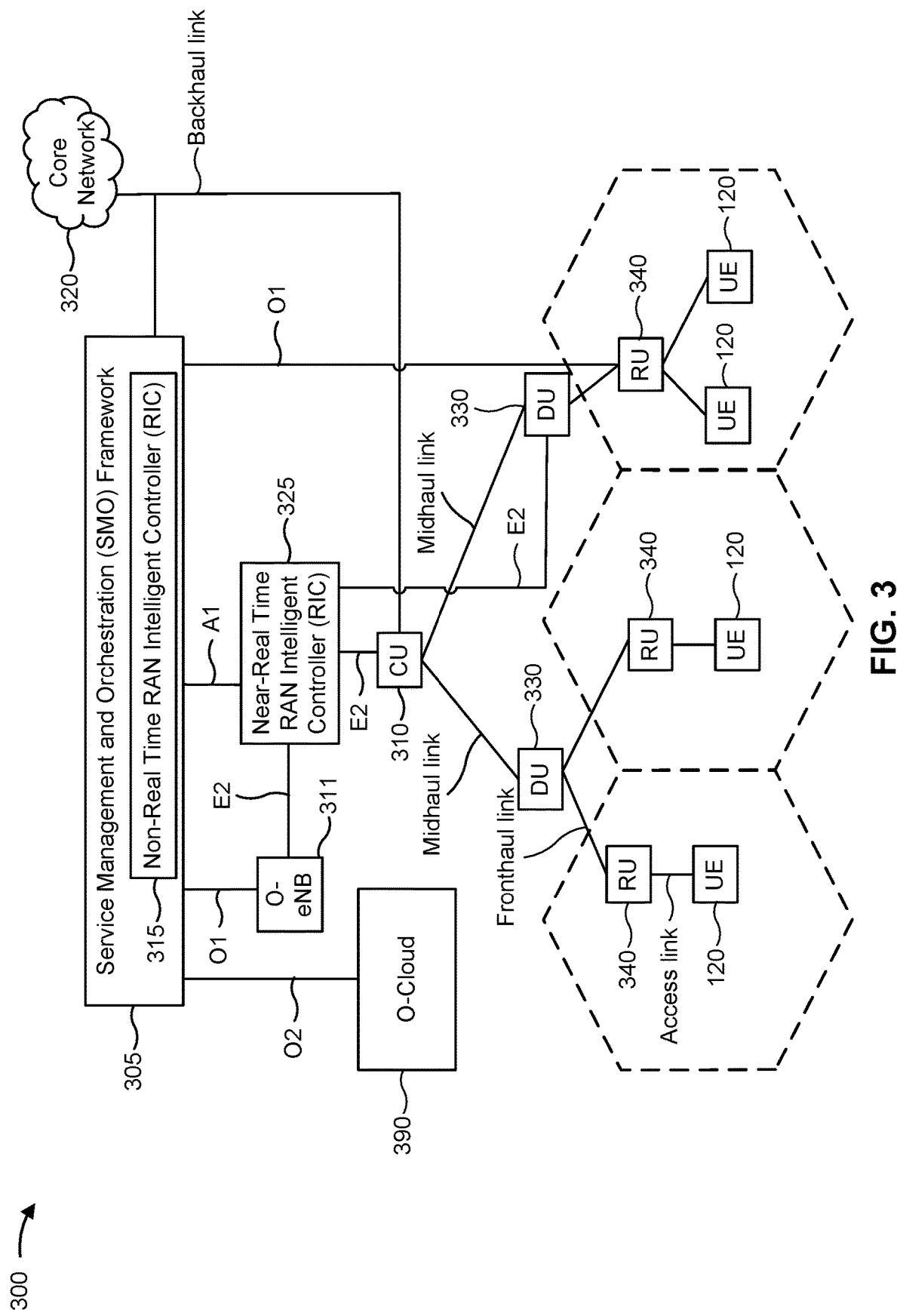
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP)

functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
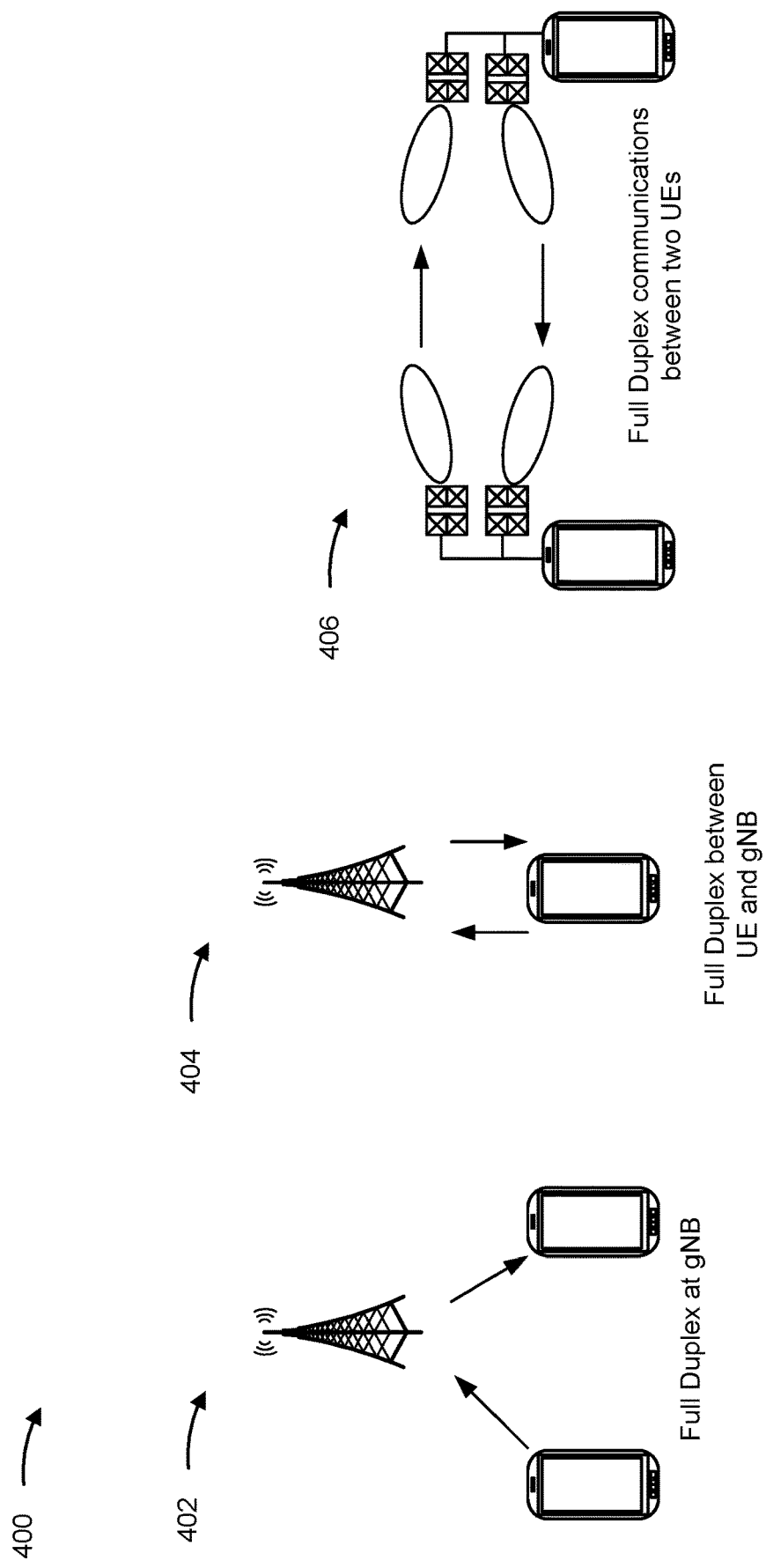
FIG. 4 is a diagram illustrating an example of full duplex communications, in accordance with the present disclosure.

FIG. 4 is a diagram illustrating an example 400 of full duplex communications, in accordance with the present disclosure.

As shown by reference number 402, a network node may be capable of full duplex communications with multiple UEs. For example, the network node may receive a first signal from a first UE and transmit a second signal to a second UE at the same time. As shown by reference number 404, a network node may be capable of full duplex communications with a single UE. For example, the network node may receive a first signal from the UE and transmit a second signal to the UE at the same time. As shown by reference number 406, full duplex communications may be between two UEs. For example, a first UE may transmit a first signal to a second UE and receive a second signal from the second UE at the same time.

As indicated above, FIG. 4 is provided as an example. Other examples may differ from what is described with regard to FIG. 4.

Good beam pairs may be identified for full duplex communications among two UEs in a sidelink mode 2. A beam pair may include a receive (Rx) beam and a transmit (Tx) beam. The sidelink mode 2 may be a UE sensing based mode (e.g., UE autonomous mode 2), as opposed to a sidelink mode 1, which may be a network-controlled mode. UEs may not be under active network control based at least in part on the sidelink mode 2. Beam pairs may be considered "good" when associated beam measurements satisfy a threshold. In other words, a "good" beam may be a beam having a beam measurement that satisfies the threshold.

A beam pair may refer to beams at the same UE. Selecting good full duplex beam pairs among two UEs may involve selecting a first beam pair (Tx-Rx) at a first UE that is full duplex capable, a second beam pair (Tx-Rx) at a second UE that is full duplex capable, and ensuring that the first and the second full duplex beam pairs provide a good value of some criteria (e.g., block error rate (BLER) or throughput) when used for transmission and reception at the same time.

The beam measurement may be an RSRP measurement, a signal-to-noise-plus-interference ratio (SINR) measurement, or an RSSI measurement. Beam pairs selected without coordination among the UEs (e.g., in a half-duplex mode) may be associated with relatively high self-interference or a relatively low signal-to-noise ratio (SNR). Thus, coordination among UEs may be needed to identify good full duplex beam pairs at both UEs.

Self-interference measurements (SIMs) among multiple beam pairs may be used to identify good full duplex beam pairs. "Self-interference measurements" may refer to a single self-interference measurement or may refer to multiple self-interference measurements. Self-interference measurements may be performed, even during half-duplex data transmissions, by passively measuring self-interference from an active Tx beam on a candidate Rx beam, which may be followed by identifying some good full duplex beam pairs. Such information may be exchanged among UEs and jointly-decided good full duplex beams may be obtained.

Traffic-based self-interference measurements or traffic-based full duplex beam pair selection may involve self-interference measurements based on solely measurements during ongoing data transmissions, and may only involve Tx beams active for data transmissions and Rx beams (for self-interference measurements) active for data reception (from the other UE).

However, some issues exist with traffic-based self-interference measurements. A first issue is that the UE may be limited to selecting its Tx beams from its active transmission beams, which may be suboptimal versus sweeping a large range of Tx beams, which may lead to lower self-interference. A second issue is that a UE may only measure a signal RSRP in bandwidth used to receive data from another UE. In scenarios when a UE transmission is on a specific bandwidth and the self-interference is measured in the transmission bandwidth, while a UE reception is on a different bandwidth, then the signal RSRP may only be measured in the reception bandwidth which is different from the bandwidth where self-interference was measured. Thus, an SINR calculation may be incorrect because a channel selectivity across bandwidth affects a signal or interference power. A third issue is that, without an extra configured reference signal for measuring self-interference in a different bandwidth than a signal transmission bandwidth, a self-interference measurement may not be accurate for later use due to frequency selectivity. For example, a self-interference measurement for beam pair selection on a first bandwidth may eventually be used to perform full duplex communications on a second bandwidth, which may be based at least in part on sensing results. When a self-interference channel is frequency selective, then self-interference measured in the Tx signal bandwidth may not be accurate for a different bandwidth. Thus, a dedicated reference signal for self-interference measurements may resolve these issues by providing the full flexibility needed for full duplex self-interference measurements.

In various aspects of techniques and apparatuses described herein, a first UE may transmit, to a second UE, reference signals using Tx beams of the first UE based at least in part on a Tx beam sweeping. The reference signals may be dedicated reference signals for self-interference measurements associated with the first UE. The first UE may perform the self-interference measurements, which may be based at least in part on the reference signals transmitted using the Tx beams of the first UE. The first UE may perform an Rx beam sweeping during the self-interference measurements to cover the Tx beam sweeping. The first UE may transmit, to the second UE, an indication of candidate full duplex Tx-Rx beam pairs, where the candidate full duplex Tx-Rx beam pairs may be based at least in part on the self-interference measurements. The second UE may receive, from the first UE, the indication of the candidate full duplex Tx-Rx beam pairs. The second UE may transmit, to the first UE, reference signals using Tx beams of the second UE, from the candidate full duplex Tx-Rx beam pairs. The second UE may perform self-interference measurements, which may be based at least in part on the reference signals transmitted using the Tx beams of the second UE. The second UE may perform an Rx beam sweeping during the self-interference measurements. The self-interference measurement (or signal measurement) may be performed at each UE. The second UE may transmit, to the first UE, an indication of a full duplex Tx-Rx beam pair selection from the candidate full duplex Tx-Rx beam pairs. The full duplex Tx-Rx beam pair selection may be based at least in part on the self-interference measurements associated with the second UE.

In some aspects, UEs may jointly select the best full duplex beam pairs with minimal overhead when dedicated reference signals for measurement are configured or allocated by the UEs. By jointly selecting the best full duplex beam pairs using dedicated reference signals, issues associated with traffic-based self-interference measurements may be avoided. The UEs may allocate resources to perform the self-interference measurements. The UEs may coordinate self-interference measurement resources, and such coordination may reduce self-interference measurement overhead. Various types of Tx and Rx beam selections may be exchanged between the UEs for maximum flexibility and performance. In some aspects, the UEs may be associated with a sidelink mode 2 (e.g., a UE autonomous sidelink operation). The UEs may be full duplex capable and set up a bidirectional link with each other. Selected beam pairs may not be sub-band specific. For example, identified beam pairs may be applied to a selected full duplex sub-band configuration (e.g., an overlapping or non-overlapping configuration). Further, the UEs may exchange control information regarding beam indices and other information.

In some aspects, regarding an Rx beam choice and reception, the self-interference measurements may depend on the Tx beam of the reference signal (as described and Tx beam sweeping will occur) but also an Rx beam. This Rx beam may be UE chosen but may depend on what Rx beam is compatible with the second UE's Tx beam(s). To accommodate second UE's Tx beam sweeps, the first UE may also Rx beam sweep during its self-interference measurements. Some prior information exchange regarding good Tx beams to sweep at each UE side may occur before self-interference measurements to maintain a large overlap between the tested Tx-Rx beam pairs. These good Tx beams may be for example good Tx beams for half-duplex communication.

In some aspects, each UE may also be measuring the RSRP of the signal from the other UE (e.g., to calculate SINR), which may need a measurement on some Rx beam. The signal RSRP measurements may occur on whatever is the best Rx beam chosen by the first UE for the second UE's Tx beam. The same Rx beam may be used for self-interference measurements as well, so that at the first UE, a Tx-Rx beam pair specific SINR may be calculated. The signal measurement may be tied to the self-interference measurements. The signal measurement at the first UE may happen before its self-interference measurements or during the second UE's self-interference measurements. As an example, the signal RSRP measurement may occur during a synchronization signal block (SSB) reception phase (e.g., initial synchronization), and later the SSB Tx/Rx beams may be evaluated during the self-interference measurements. Alternatively, while the second UE is transmitting its reference signal for self-interference measurements, the first UE may measure the signal RSRP from the first UE, which may involve coordination between the UEs.

Figure 5:
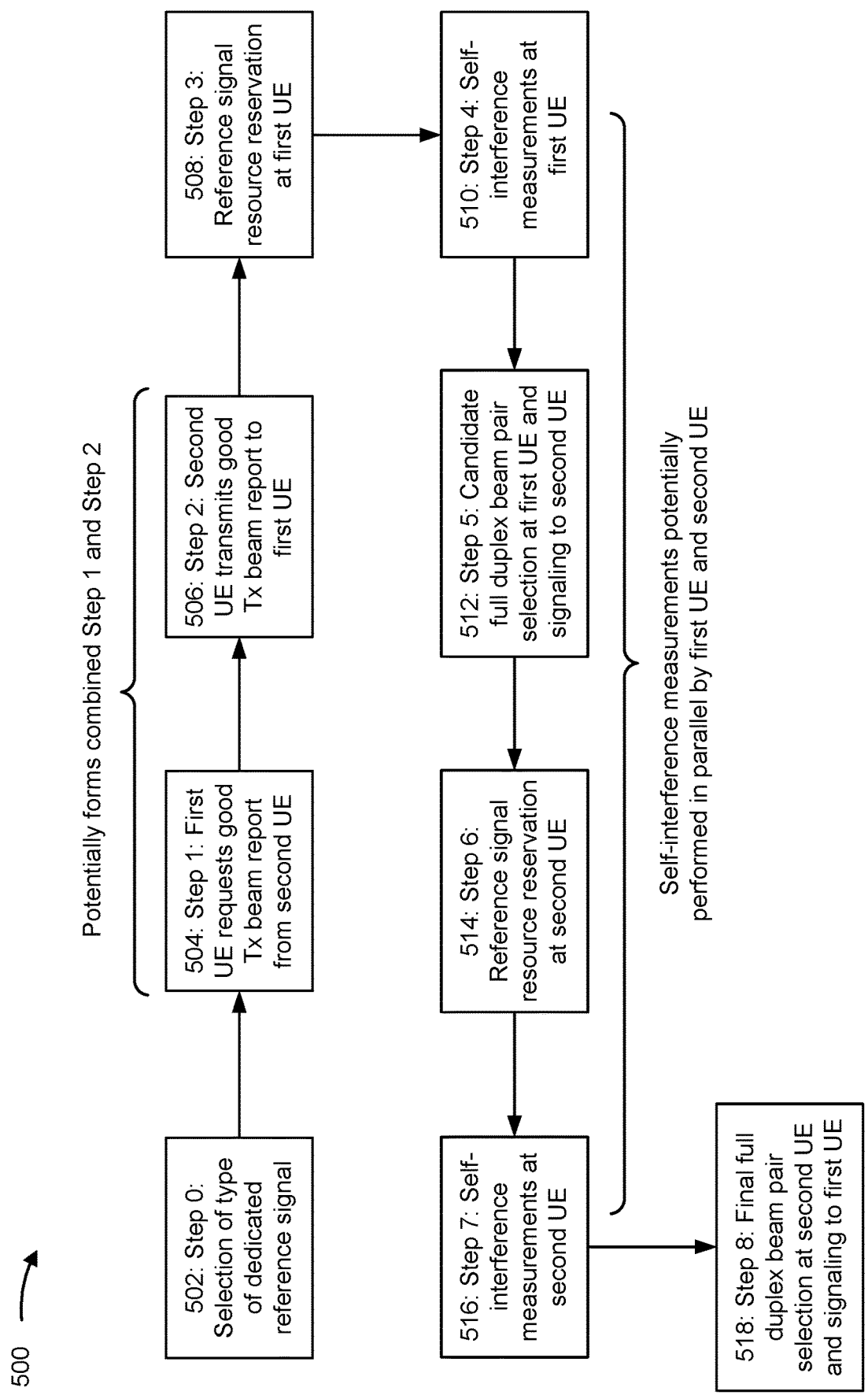
FIGS. 5-11 are diagrams illustrating examples associated with full duplex beam pair selection for sidelink communications, in accordance with the present disclosure.

FIG. 5 is a diagram illustrating an example 500 associated with full duplex beam pair selection for sidelink communications, in accordance with the present disclosure.

As shown by reference number 502, in step 0, a type of dedicated reference signal may be selected. As shown by reference number 504, in step 1, a first UE (UE A) may request a good Tx beam report from a second UE (UE B) (further shown in FIG. 6). As shown by reference number 506, in step 2, the second UE may transmit the good Tx beam report to the first UE (further shown in FIG. 7). Alternatively, step 1 and step 2 may be combined to form a combined step 1 and step 2. In the combined step 1 and step 2, the first UE and the second UE may exchange information regarding good Tx beams for the first UE and the second UE, respectively. As shown by reference number 508, in step 3, a reference signal resource reservation may be performed at the first UE (further shown in FIG. 8). As shown by reference number 510, in step 4, self-interference measurements may be performed at the first UE (further shown in FIG. 9). As shown by reference number 512, in step 5, a candidate full duplex beam pair selection may be performed at the first UE and signaled to the second UE (further shown in FIG. 10). As shown by reference number 514, in step 6, a reference signal resource reservation may be performed at the second UE. As shown by reference number 516, in step 7, self-interference measurements may be performed at the second UE. Alternatively, self-interference measurements may be performed independently and/or in parallel by the first UE and the second UE, respectively, instead of being performed sequentially. As shown by reference number 518, in step 8, a final full duplex beam pair selection may be performed at the second UE and signaled to the first UE (further shown in FIG. 11). Steps 0 through 8 are described in further detail herein.

As indicated above, FIG. 5 is provided as an example. Other examples may differ from what is described with regard to FIG. 5.

In some aspects, in step 0, a dedicated reference signal for self-interference measurements may be a preconfigured reference signal (a first option), such as an SSB or a channel state information reference signal (CSI-RS), or may be a dedicated reference signal (a second option), such as a dedicated sounding reference signal (SRS) or a dedicated CSI-RS.

In some aspects, in the first option, the preconfigured reference signal may be used as the dedicated reference signal for self-interference measurements. An existing reference signal, such as an SSB, may be sweeping a plurality of Tx beams (e.g., sweeping more Tx beams than active Tx beams being used for data), and thus, may be a good candidate to use for self-interference measurements. The preconfigured reference signal may be periodic, aperiodic, or semi-persistent. A UE may select its Tx beams for self-interference measurements as a subset of SSB beams, and then the UE may measure self-interference on Rx beams matched to the other UE's SSB beams, as well as measure a desired RSRP on the same Rx beams. The UE may measure self-interference on certain potential Rx beams. The certain potential Rx beams may be signaled to the UE, or may be determined by the UE.

In some aspects, in the second option, the dedicated reference signal may be used for self-interference measurements. The dedicated reference signal may be used when an SSB or CSI-RS periodicity is longer than a certain duration, which may lead to a longer latency for a self-interference measurement procedure. The dedicated reference signal may be used because an SSB and/or CSI-RS bandwidth may be misaligned with a desired measurement bandwidth, and/or the UE may not support a simultaneous SSB transmission and measurement. The UEs may configure dedicated transmission reference signals, such as the dedicated SRS or the dedicated CSI-RS, as needed. Further, the Tx beam for the reference signal may be matched to a desired Tx beam to sweep for the self-interference measurement procedure.

In some aspects, in step 0, UEs, such as a first UE and a second UE, may exchange control information with each other to form a consensus to use the preconfigured reference signal (e.g., an existing SSB or CSI-RS) or the dedicated reference signal for self-interference measurements for full duplex communications. Alternatively, the UEs may determine to use the preconfigured reference signal or the dedicated reference signal independently and communicate the choice to the other UE.

In some aspects, in a combined step 1 and step 2, for a signal RSRP/RSSI measurement, the second UE may need to know which Tx beams the first UE will be sweeping e.g., SSB-A-1, SSB-A-3. The second UE may appropriately select Rx beams and measure a signal RSRP, which may be needed later for its SINR calculation. In this case, knowledge of the Tx beams of the first UE may be made available to the second UE before performing self-interference measurements. In the combined step 1 and step 2, the UEs may exchange information regarding preferred Tx/Rx beams to sweep during self-interference measurements.

In some aspects, the first UE may request a report of X>=1 strongest SSB-A beams from the second UE. The second UE may report the X>=1 strongest SSB-A beams to the first UE. The second UE may request the first UE on information regarding first UE's preferred Tx beams to sweep during self-interference measurements and the sequence. The first UE may transmit this report to the second UE after a resource reservation (step 3) or before the resource reservation.

In some aspects, both UEs may start the full duplex self-interference measurement process without waiting for the other UE to finish (e.g., the second UE may not wait for the first UE to transmit the candidate full duplex beam pairs), which may save time. The combined step 1 and step 2 may enable both UEs to obtain the report of preferred Tx (and optionally preferred Rx) beams to be used during self-interference measurements by the other UE, and then both UEs may branch off to do their own self-interference measurements. Following this, one UE may finish and transmit the self-interference measurement report to the other UE, or both UEs may transmit their respective self-interference measurement reports (where the self-interference measurement report may be equivalent to the report containing the candidate full duplex beam pairs). Joint optimization criterion may be evaluated at the UE(s), which may possess the reports from both the UEs, to select at least one final full duplex beam pair set and signal an indication of the final full duplex beam pair set to the other UE.

In some aspects, for the combined step 1 and step 2, the UEs may wish to identify good Tx and Rx beams to sweep during their self-interference measurement procedures. The UEs may utilize the fact that some Tx beams of the first UE will have a better RSRP at the second UE than other Tx beams, and knowing which of its Tx beams are better, may help the first UE select good Tx beams to sweep during the self-interference measurement procedure (similar for the second UE). Further, knowing at the second UE which Tx beams will be swept by the first UE during the self-interference measurement procedure may help the second UE select a set of Rx beams that are well matched to the first UE's Tx beams for e.g., which provide a high received power for the desired signal. This way, the second UE may arrive at a set of Rx beams to sweep. This knowledge of Rx beams may also be required to measure the desired (signal) RSRP on each of these beams (similar for the first UE) to be able to compute certain quality metrics such as SINR. With the combined step 1 and step 2, the UE may be able to find a good set of Tx beams and a good set of Rx beams to sweep during the self-interference measurement procedures.

In some aspects, for the combined step 1 and step 2, any UE may subsequently start its self-interference measurements, thus providing a balance between both UEs. In some aspects, during the combined step 1 and step 2, the first UE may request information from the second UE regarding good first UE Tx beams, from the perspective of the second UE. The second UE may request information from the first UE regarding good second UE Tx beams, from the perspective of the first UE. The first UE and the second UE may send the requested beam reports to each other. The first UE may select a set of Tx beams to sweep, and the first UE may signal the set to the second UE. In addition to using the information in the second UE's report about good first UE Tx beams, the first UE may use its own intelligence/local information to select the set of Tx beams to sweep, for example, using an ML model, maximum power reduction (MPR) criterion, and/or the presence of nearby clutter. The signaled Tx beams set may not match the second UE's reported good first UE Tx beams due to such reasons. The second UE may select a set of Tx beams to sweep, and the second UE may signal the set to the first UE, using similar logic to the first UE. The first UE may select the Rx beams to sweep based at least in part on information received from the second UE. The second UE may select the Rx beams to sweep based at least in part on information received from the first UE.

In some aspects, in an alternative step 1 (in which step 1 and step 2 are separate steps and are not combined), the first UE may request the second UE for a number of beams (e.g., X≥1 beams) having a good RSRP at the second UE. The request may not be needed when the first UE already has information regarding a sufficient set of good RSRP Tx beams which can be swept, for example, from a previously received beam measurement report. The Tx beams may be SSB beams or CSI-RS beams, as transmitted by the first UE. The Tx beams may be transmitted from a plurality of panels. For example, a first panel, a second panel, and a third panel may be considered for a full duplex transmission. Optionally, RSRP or RSSI values for the Tx beams may also be requested. In some aspects, instead of sweeping a plurality of possible Tx beams (e.g., all possible Tx beams) for self-interference measurements, the first UE may only sweep those Tx beams that are guaranteed to have a good link SNR.

Figure 6:
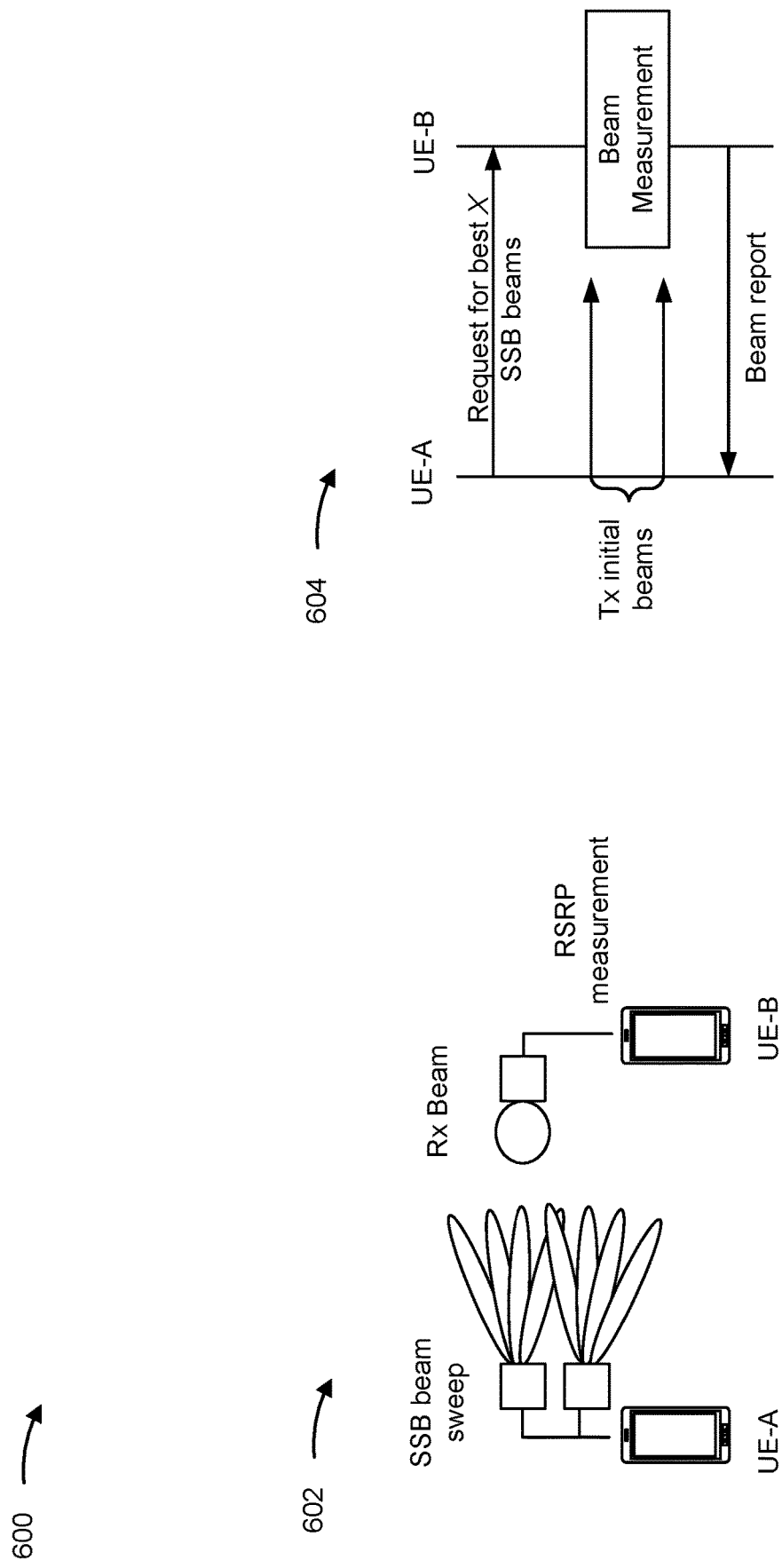

FIG. 6 is a diagram illustrating an example 600 associated with full duplex beam pair selection for sidelink communications, in accordance with the present disclosure.

As shown by reference number 602, in an alternative step 1, a first UE (UE A) may perform a beam sweep using a plurality of SSB or CSI-RS beams. During the beam sweep, the first UE may transmit the plurality of SSB or CSI-RS beams. A second UE (UE B) may receive the plurality of SSB or CSI-RS beams via an Rx beam, and the second UE may perform RSRP measurements based at least in part on the plurality of SSB or CSI-RS beams.

As shown by reference number 604, in the alternative step 1, the first UE may transmit, to the second UE, a request for the best X beams (e.g., the best X SSB beams or the best X CSI-RS beams). The first UE may perform a beam sweep by transmitting a plurality of SSB or CSI-RS beams (e.g., Tx initial beams). The second UE may perform beam measurements based at least in part on the plurality of SSB or CSI-RS beams. The second UE may transmit, to the first UE, a beam report indicating the beam measurements.

As indicated above, FIG. 6 is provided as an example. Other examples may differ from what is described with regard to FIG. 6.

In some aspects, in an alternative step 2, the second UE may report some good Tx beams of the first UE. The second UE may report the first UE's good Tx beams when the second UE has not already reported such information in a previous beam report. The first UE may reuse the previous beam report from the second UE for a certain period of time, after which the previous beam report will become outdated. Good beams may be decided based at least in part on measurement on a beam satisfying an SINR or RSRP threshold. The SINR or RSRP threshold may be predefined in a specification, or may be decided by one UE or both UEs via a negotiation between the UEs. The second UE may report good beams while optimizing a reporting overhead. A good beam reporting format may maximize the flexibility of the first UE to sweep as many Tx beams as possible, which may be good for finding the best full duplex beam pair, while also minimizing the reporting overhead.

In some aspects, in the alternative step 2, the second UE may signal, to the first UE, a relatively wide set of Tx beams (e.g., as wide of a set as possible) to prevent unnecessary restriction on the Tx beams of the first UE during self-interference measurements in the beginning, while maintaining a reasonable reporting overhead. The second UE may signal, to the first UE, a good beam identifier (ID) list or a bitmap of beam IDs indicating which beams are good. The second UE may report, to the first UE, only the top X beam IDs, which may allow a tradeoff between a candidate set size and the reporting overhead. A good Tx beam may be decided based at least in part on a measurement on that beam satisfying a RSRP or SINR threshold.

In some aspects, in the alternative step 2, the good beam IDs may be reported in an optimized manner, either using an inclusion set of beam IDs or an exclusion set of beam IDs. A first part of the good beam IDs report may be of a fixed size indicating whether the inclusion set of beam IDs or the exclusion set of beam IDs is used for a second part. The first part may also indicate a length of the second part. The second part may be of variable size and may indicate a set of included beam IDs or a set of excluded beam IDs. When a plurality of beams (e.g., all beams) are good, the second part may be omitted to signal this implicitly. For example, three types of beam reporting may be possible. In a first type, when the plurality of beams are good, then the second UE may signal a no set assumption needed and a size of the second part may be zero. In a second type, when the plurality of Tx beams except a relatively small set of Tx beams are good, the second UE may signal an exclusion set assumption and the set of bad Tx beams. A "bad" Tx beam may be a beam having a beam measurement that does not satisfy a threshold. In a third type, when a set of Tx beams are good, the second UE may signal an inclusion set assumption and the set of good Tx beams.

Figure 7:
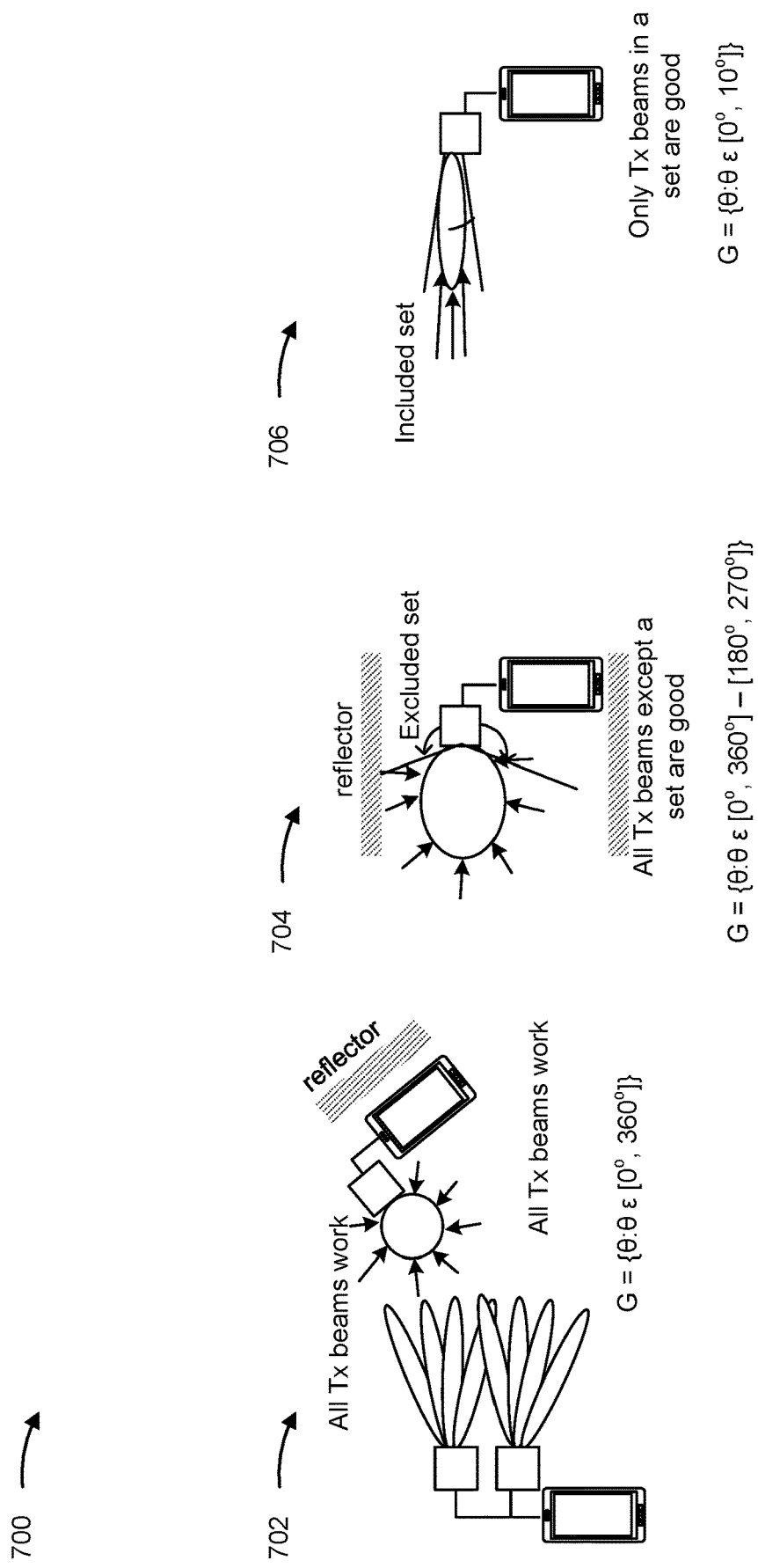

FIG. 7 is a diagram illustrating an example 700 associated with full duplex beam pair selection for sidelink communications, in accordance with the present disclosure.

In some aspects, in the alternative step 2, various types of good beam ID reporting may be employed, where G is a representation of a set of good Tx beams in terms of an angle of departure θ. As shown by reference number 702, all angles θ have good reception, and hence set G is the complete range of θ from [0°, 360°], so no set of good beam IDs needs to be signaled between UEs, as it may be implicit by the absence of the signaled set that all Tx beams are good beams. In this case, all Tx beams may be good. As shown by reference number 704, all Tx beams except those with an angle of departure (AOD) θ∈[180°, 270°] are good beams, and this exclusion set may be signaled between UEs. In this case, all Tx beams except a set of Tx beams may be good. As shown by reference number 706, only Tx beams with AOD θ∈[0°, 10°] are good beams, and this inclusion set may be signaled between UEs. In this case, only Tx beams in a set may be good.

As indicated above, FIG. 7 is provided as an example. Other examples may differ from what is described with regard to FIG. 7.

Figure 8:
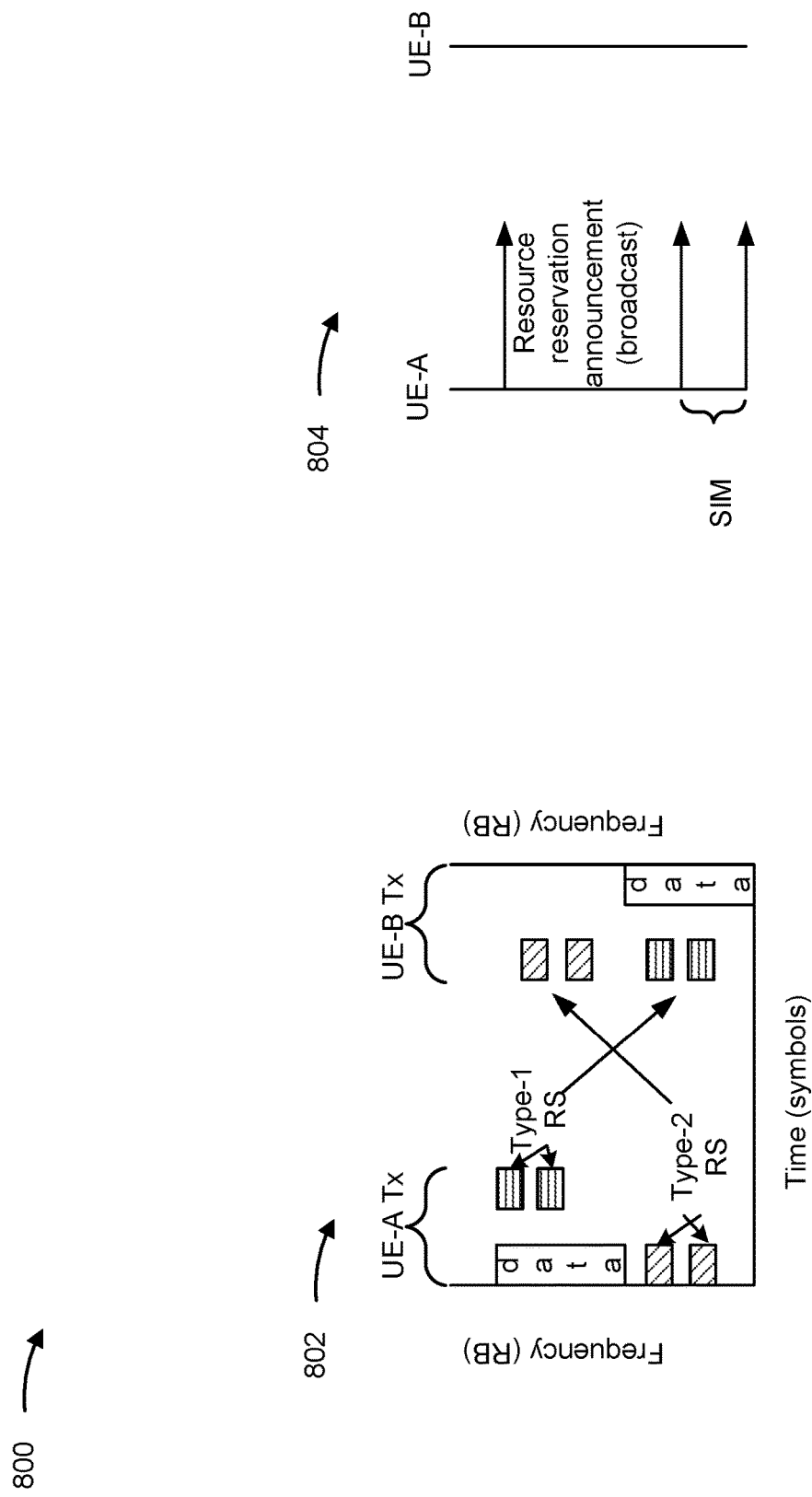

FIG. 8 is a diagram illustrating an example 800 associated with full duplex beam pair selection for sidelink communications, in accordance with the present disclosure.

In some aspects, in step 3, which may follow the combined step 1 and step 2, or which may follow the alternative step 1 and the alternative step 2, a first UE (UE A) may reserve reference signal transmission resources for some good Tx beams. Time and/or frequency resources may be reserved based at least in part on available resources found during sensing at the first UE.

As shown by reference number 802, in step 3, two types of reference signal transmission resources may be reserved or needed for the first UE. A first type of reference signal transmission resources (Type-1 RS) may be used, by the first UE, to sweep additional Tx beams for self-interference measurements. Such resources may overlap in bandwidth with Tx data. A second type of reference signal transmission resources (Type-2 RS) may be used, by the first UE, to perform a self-interference measurement in a different bandwidth than current Tx data. For example, such resources may be used to measure self-interference in a different bandwidth or provide a reference signal that is overlapped with another UE's Tx bandwidth to aid in measuring a desired signal RSRP at the other UE. The first UE may reserve time and frequency resources according to the first type and/or the second type, depending on the types of reference signal transmission resources needed. The types of reference signal transmission resources needed may be configured or negotiated among UEs, such as between the first UE and a second UE (UE B). Further, reservations may be broadcast on a sidelink channel.

As shown by reference number 804, in step 3, the first UE may transmit a resource reservation announcement message via a broadcast. The first UE may reserve reference signal transmission resources for some good Tx beams of the first UE based at least in part on the resource reservation announcement message. The first UE may be able to perform self-interference measurements using the reserved reference signal transmission resources (as further discussed in relation to step 4).

As indicated above, FIG. 8 is provided as an example. Other examples may differ from what is described with regard to FIG. 8.

In some aspects, in step 4, the first UE may transmit with selected Tx beams, and the first UE may perform self-interference measurements on selected Rx beams. The first UE may select only those Tx and Rx beam pairs for self-interference measurements that are on different panels. Ongoing half-duplex data transmission occasions may be included in a measurement process. The second UE may measure a desired signal RSRP or SNR achieved by the first UE's Tx beams on its selected Rx beams, when the first UE transmits a reference signal for self-interference measurement. Alternatively, if the second UE has already completed desired signal RSRP or SNR measurement for a Tx beam of the first UE before the first UE transmits a reference signal with that Tx beam, the first UE may request the second UE to remeasure an RSRP and/or an SNR on its Tx beams (e.g., when some analog or digital parameters of the Tx beams for a reference signal have changed from the previously measured SSB beams). The measured desired signal RSRP or SNR values may be saved by the second UE for calculations (e.g., of beam-pair specific SINR) during its own self-interference measurement procedure.

In some aspects, the first UE may perform self-interference measurements and the second UE's self-interference measurements may follow sequentially, but in some cases, both UEs may perform independent self-interference measurements and then exchange relevant information based at least in part on the independent self-interference measurements.

In some aspects, in step 4, the first UE may perform the self-interference measurements. In some aspects, regarding a self-interference reference signal power, the first UE may lower its Tx power for reference signals, so that the reference signals do not interfere with other UEs reception. Self-interference may be measured even when a reference signal is below a noise level (due to using a correlator), or the first UE may successively increase a reference signal power until the first UE is able to measure an RSRP of the reference signal. In some aspects, regarding incorporating reference signal measurements from the second UE, when the second UE's transmitted reference signal is needed at the first UE for a signal RSRP measurement (e.g., type 2 reference signal), then two options may be available. In a first option, the first UE may select (and signal) full duplex beam pairs based at least in part on self-interference measurements, and the first UE may refine the full duplex beam pairs later after an RSRP measurement is completed. The RSRP measurement at the first UE may be completed during the self-interference measurement procedure of the second UE. In a second option, the first UE and the second UE may both finish reference signal transmissions, after which each UE may compute a required metric (e.g., SINR) and may exchange candidate full duplex beam pairs according to the computed metric. In some aspects, regarding the selection of Rx beams to sweep for self-interference measurement, in a first option, the Rx beams may be chosen autonomously by the first UE. In a second option, the Rx beams may be based at least in part on some indicated good Tx beams of the second UE. The first UE may request these good Tx beams of the second UE in Step 1, and/or the second UE may report these good Tx beams of the second UE in Step 2.

Figure 9:
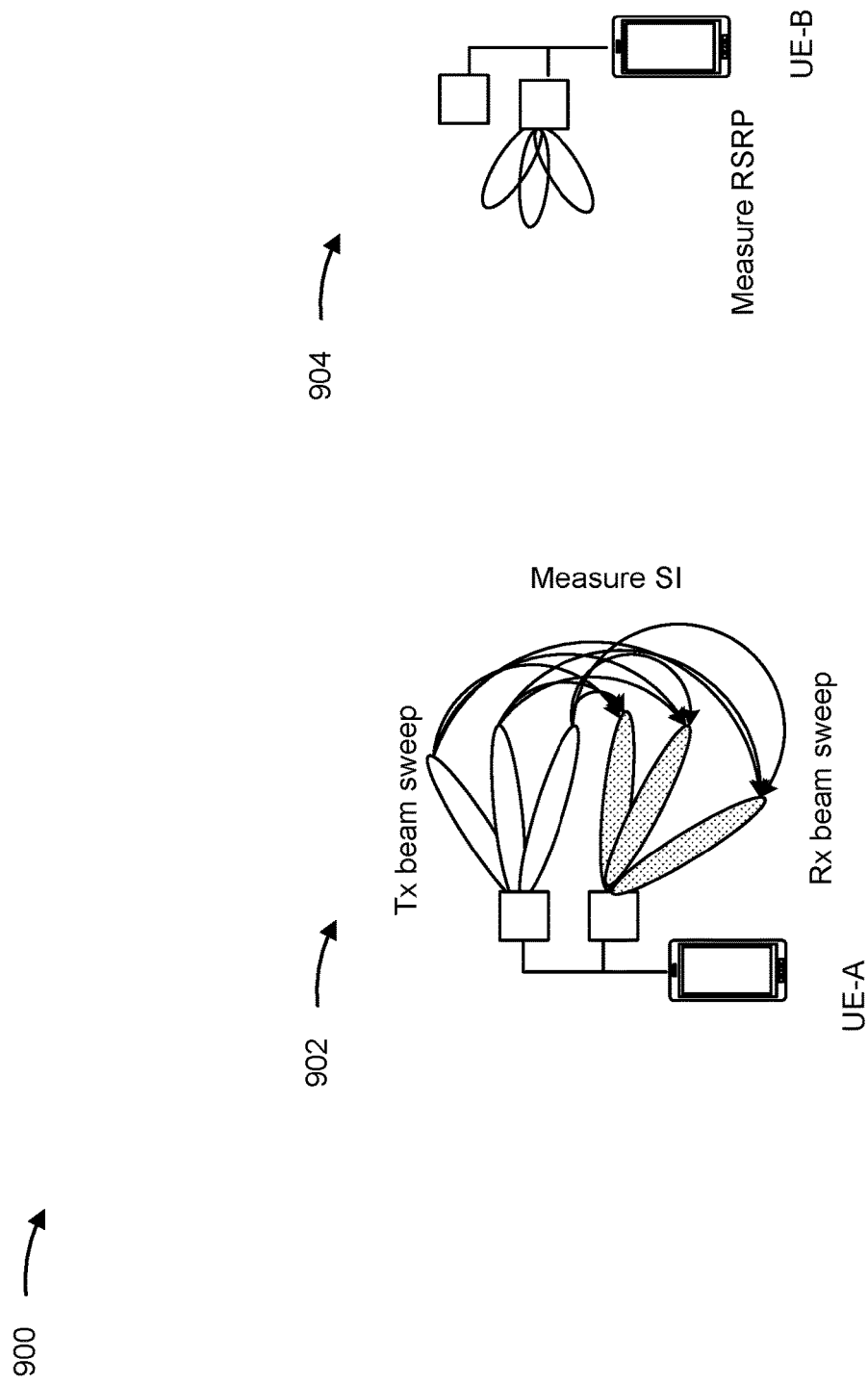

FIG. 9 is a diagram illustrating an example 900 associated with full duplex beam pair selection for sidelink communications, in accordance with the present disclosure.

As shown in FIG. 9, in step 4, a first UE (UE A) may perform a Tx beam sweep using the selected Tx beams. The first UE may perform an Rx beam sweep using some Rx beams. The first UE may perform the self-interference measurements on some Rx beams based at least in part on the Rx beam sweep. A second UE (UE B) may receive the Tx beams from the first UE, and the second UE may perform associated RSRP measurements. The first UE may perform the Tx beam sweep and perform the self-interference measurements based at least in part on a selection of a reference signal power, an incorporation of reference signal measurements from the second UE, and/or a selection of the Rx beams.

As indicated above, FIG. 9 is provided as an example. Other examples may differ from what is described with regard to FIG. 9.

In some aspects, in step 5, the first UE may select some candidate full duplex Tx-Rx beam pairs, which may be based at least in part on self-interference measurements at the first UE. The first UE may signal the candidate full duplex Tx-Rx beam pairs to the second UE. The signaling may be optimized to reduce the signaling overhead and maximize the choice of candidate beam pairs signaled. The candidate Tx-Rx beam pairs may be signaled as individual Tx-Rx beam pairs, or a paired Tx beam set and Rx beam set, where each set may include multiple beams. Tx beams and Rx beams may be grouped into a set, which are then paired together. A plurality of Tx beams (e.g., all Tx beams) in the set may be associated with a low self-interference or a high SINR with a plurality of Rx beams (e.g., all Rx beams) in the paired set, which may reduce the signaling overhead while allowing more flexibility for the second UE to test more candidate full duplex pairs.

In some aspects, in step 5, the first UE may signal, to the second UE, the candidate pair of Tx beam (or beam set) and the Rx beam (or beam set). The candidate Tx (or Rx) beam (or beam set) at the first UE may be signaled to the second UE using a set or bitmap of beam IDs, and using an omni-set (e.g., all beams are good), an inclusion set (e.g., some good beams), or an exclusion set (e.g., all beams except the beams indicated are good). The first UE may attempt to report a relatively wide set of Tx and Rx beams, while maintaining a reasonable reporting overhead. The first UE may signal X>=0 chosen candidate full duplex Tx-Rx beam pairs to the second UE, or the second UE may request such information from the first UE, where X may be negotiated among the UEs, selected by the first UE, or predefined in a specification.

Figure 10:
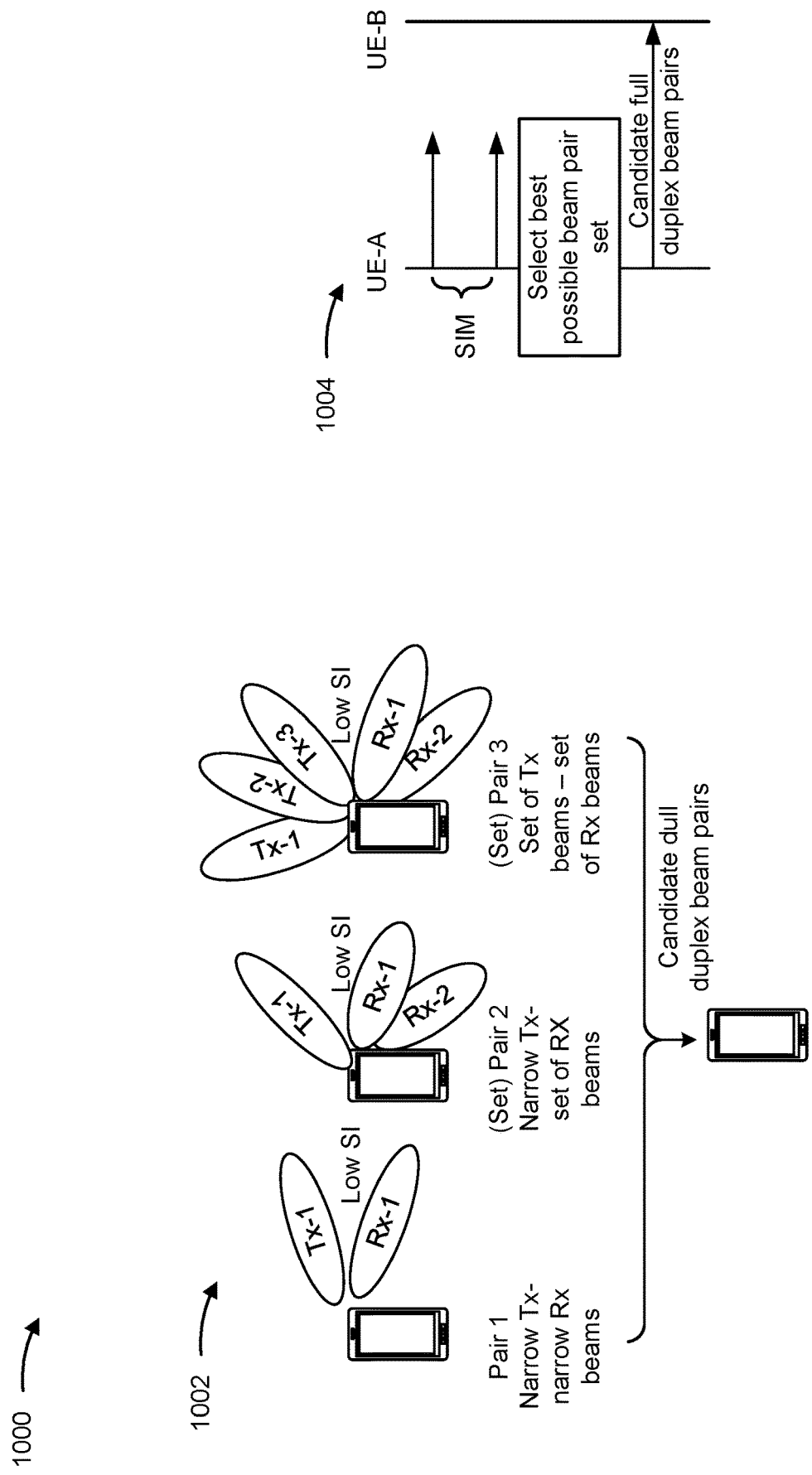

FIG. 10 is a diagram illustrating an example 1000 associated with full duplex beam pair selection for sidelink communications, in accordance with the present disclosure.

As shown by reference number 1002, in step 5, Tx beam(s) and Rx beam(s) may be grouped into a set and paired together, such that all Tx beams in a set may give a low self-interference or high SINR with all Rx beams in the set. For example, a first pair may include a narrow Tx beam and a narrow Rx beam, which may be associated with relatively low self-interference. A second pair may include a narrow Tx beam and a set of Rx beams, which may be associated with relatively low pairwise self-interference. A third pair may include a set of Tx beams and a set of Rx beams, all of which may be associated with relatively low pairwise self-interference. The first pair, the second pair, and the third pair may form candidate full duplex beam pairs.

Signaling an Rx beam ID (e.g., by a first UE) may be done via signaling the corresponding Tx beam ID of the other UE (e.g., the second UE) to which the Rx beam is matched, which may be to ensure that the other UE (e.g., the second LIE) understands from the signaling, which beam was being received from amongst its own Tx beams. The beam IDs shown in FIG. 10 should be understood in this context. Otherwise, the Rx beam ID would not be understood to the second UE. The Rx beam ID may be signaled as the matched second UE's Tx beam ID.

As shown by reference number 1004, in step 5, a first UE may perform self-interference measurements. The first UE may select a best possible beam pair set, which may be associated with candidate full duplex Tx-Rx beam pairs. The first UE may transmit, to the second LIE, an indication of the candidate full duplex Tx-Rx beam pairs.

As indicated above, FIG. 10 is provided as an example. Other examples may differ from what is described with regard to FIG. 10.

In some aspects, in step 6, the second UE may reserve time and frequency resources for reference signal and data transmissions on a subset of its Tx beams (e.g., Tx beams indicated by the first UE in Step 5) for the purpose of self-interference measurements. In a parallel case, in which the first UE and the second LIE perform independent self-interference measurements in parallel, the second LIE may reserve the time and frequency resources after Steps 1 and 2.

In one option, the Tx beams may be a random subset or a fixed subset of the candidate full duplex Rx beams indicated by the first UE. In a second option, some Tx beams may be the candidate full duplex Rx beams indicated by the first UE while other Tx beams may be chosen from outside the signaled candidate set, by the second UE. In a third option, all Tx beams may be chosen from outside the signaled candidate set, by the second UE. The third option may be related to parallel/independent self-interference measurements at both UEs when a candidate set signaling has not happened. The sets may be based at least in part on the information gained during Steps 1 and 2. Some extra measurements may be needed as compared to the sequential self-interference measurements case, because the candidate set would otherwise be smaller.

The second UE may schedule the reference signals based at least in part on the reservation of time and frequency resources, which may be based at least in part on a Type-1 RS or a Type-2 RS (similar to Step 3). The second UE may transmit the reference signals on different bandwidths (as requested or negotiated by the first UE). When a reference signal with the same beam ID is configured to be transmitted in multiple bandwidths by the second UE, then the computation (and signaling) of candidate full duplex beam pair by the first UE may be an event triggered by finishing measurements on the multiple bandwidths and calculating an average RSRP.

In some aspects, in step 7, the second UE may transmit the reference signals on its reserved resources. The reference signals may include one or more SRS, DMRSs, SSBs, and/or CSI-RSs. The second UE may measure self-interference on some Rx beams, which may be based at least in part on the reference signals transmitted by the second UE. In one option, the Rx beams may be a fixed subset or a random subset of the candidate full duplex Tx beams indicated by the first UE. In a second option, some Rx beams may be chosen from the candidate full duplex Tx beams indicated by the first UE while other Rx beams may be chosen from outside the indicated candidate set. In a third option, all Rx beams may be chosen from outside the indicated candidate set. The second UE may also use different panels for reception, as long as corresponding Rx beams are associated with some full duplex Tx beam in the candidate full duplex Tx beams. The second UE may compute a set of candidate full duplex beam pairs, based on its measurement, that satisfies a certain metric threshold (e.g., SINR threshold) or maximizes a certain metric (e.g., SINR).

In some aspects, in step 8, the second UE may attempt to select a second level of one or more candidate full duplex beam pairs (e.g., at least one beam pair for both UEs) by maximizing a metric, and the second UE may signal an indication of the one or more selected full duplex beam pairs to the first UE. As an example, the metric may be max(min (SINR-A, SINR-B)), where SINR-A and SINR-B are the SINRs at the first UE and the second UE, respectively, when using a specific full duplex beam pair. One full duplex beam pair may be applied (or evaluated) at both UEs with the understanding that a Tx-Rx full duplex beam pair at a first UE translates directly to another Tx-Rx full duplex beam pair at the second UE, where the Tx beam at one UE decides the Rx beam at the other UE. The full duplex beam pairs for evaluating the metric may be chosen from the union or intersection of the candidate set of full duplex beam pairs selected by the first UE and the candidate set of full duplex beam pairs selected by the second UE. Further, SINR-A may be equal to the signal measured at the first UE divided by self-interference measured at the first UE. The signal measurement at the first UE may correspond to the RSRP of the dedicated reference signal or data DMRS, which may be measured within a self-interference measurement bandwidth or outside of the self-interference measurement bandwidth (e.g., an Rx half-duplex bandwidth). The second UE may transmit the second level of selected list of candidate full duplex beam pairs to the first UE. The second level may be a result of the second UE first performing its own self-interference measurements and having a first candidate selection, and then selecting a second narrow set based at least in part on the first UE's selection, which may support parallel as well as sequential self-interference measurements.

Alternatively, the second UE may request the list of candidate full duplex beam pairs when needed. The second UE may treat its selection as the final full duplex beam pair set, or the first UE may select its final full duplex beam pair set from the list of candidate full duplex beam pairs and may notify the second UE of the final full duplex beam pair set.

In some aspects, the full duplex beam pairs may be applied to selected full duplex occasions, even with non-overlapping frequency resources for transmission and reception, because the selected beam pairs may minimize the worst-case interference (e.g., interference seen with overlapped transmission and reception frequency resources). The performance in scenarios with non-overlapping frequency resources for transmission and reception may be better than the performance in scenarios with overlapping frequency resources.

Figure 11:
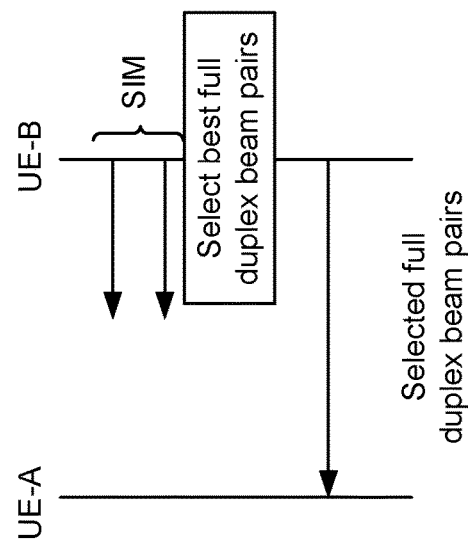

FIG. 11 is a diagram illustrating an example 1100 associated with full duplex beam pair selection for sidelink communications, in accordance with the present disclosure.

As shown in FIG. 11, in step 8, a second UE (UE B) may perform self-interference measurements, which may be based at least in part on transmitted reference signals using reserved resources. The second UE may select best full duplex beam pairs, which may be based at least in part on the self-interference measurements. The second UE may indicate, to a first UE (UE A), selected full duplex beam pairs.

As indicated above, FIG. 11 is provided as an example. Other examples may differ from what is described with regard to FIG. 11.

Figure 12:
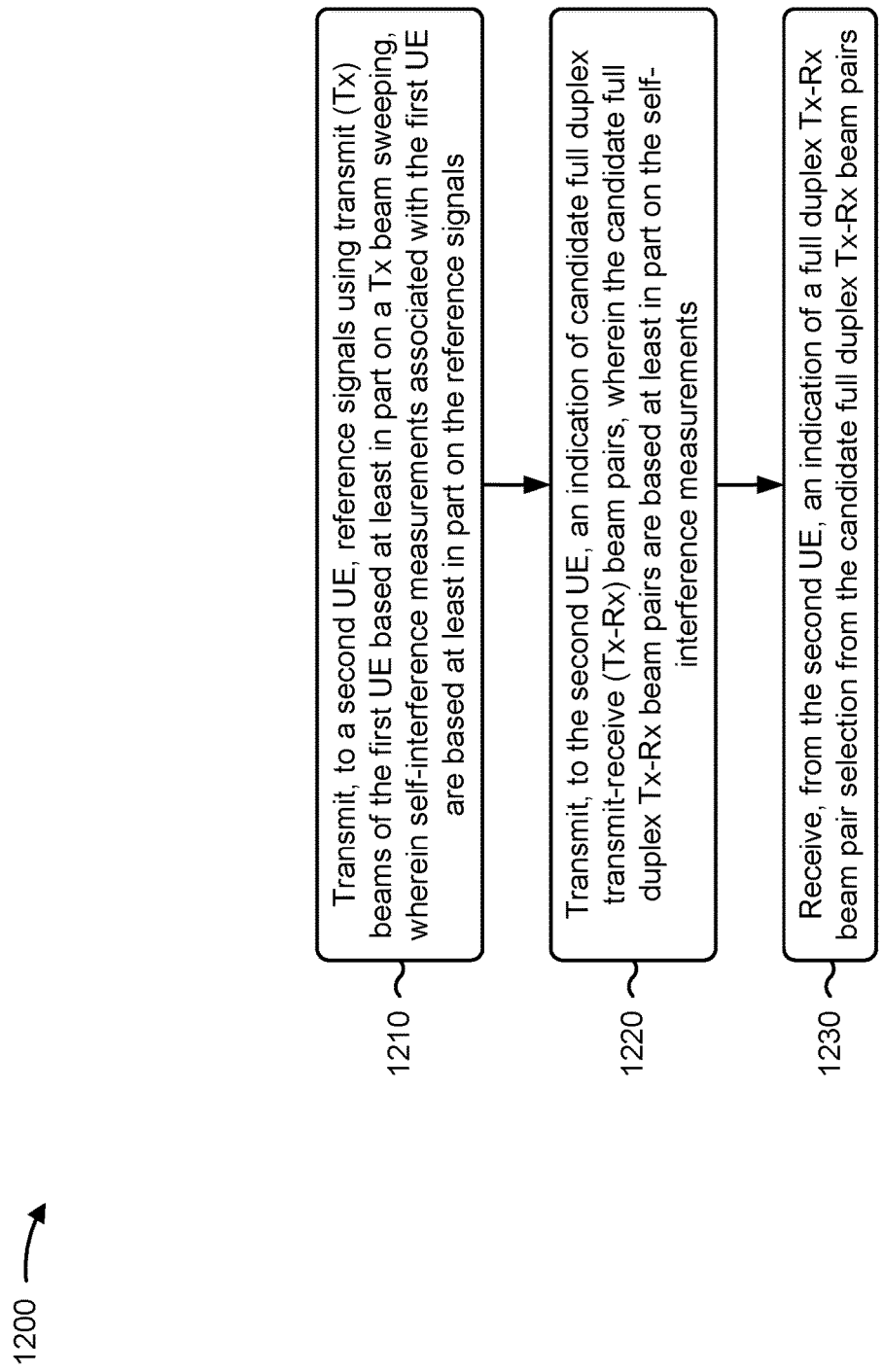
FIGS. 12-13 are diagrams illustrating example processes associated with full duplex beam pair selection for sidelink communications, in accordance with the present disclosure.

FIG. 12 is a diagram illustrating an example process 1200 performed, for example, by a first UE, in accordance with the present disclosure. Example process 1200 is an example where the first UE (e.g., UE 120a) performs operations associated with full duplex beam pair selection for sidelink communications.

As shown in FIG. 12, in some aspects, process 1200 may include transmitting, to a second UE, reference signals using Tx beams of the first UE based at least in part on a Tx beam sweeping, wherein self-interference measurements associated with the first UE are based at least in part on the reference signals (block 1210). For example, the first UE (e.g., using transmission component 1404 and/or communication manager 1406, depicted in FIG. 14) may transmit, to a second UE, reference signals using Tx beams of the first UE based at least in part on a Tx beam sweeping, wherein self-interference measurements associated with the first UE are based at least in part on the reference signals, as described above.

As further shown in FIG. 12, in some aspects, process 1200 may include transmitting, to the second UE, an indication of candidate full duplex Tx-Rx beam pairs, wherein the candidate full duplex Tx-Rx beam pairs are based at least in part on the self-interference measurements (block 1220). For example, the first UE (e.g., using transmission component 1404 and/or communication manager 1406, depicted in FIG. 14) may transmit, to the second UE, an indication of candidate full duplex Tx-Rx beam pairs, wherein the candidate full duplex Tx-Rx beam pairs are based at least in part on the self-interference measurements, as described above.

As further shown in FIG. 12, in some aspects, process 1200 may include receiving, from the second UE, an indication of a full duplex Tx-Rx beam pair selection from the candidate full duplex Tx-Rx beam pairs (block 1230). For example, the first UE (e.g., using reception component 1402 and/or communication manager 1406, depicted in FIG. 14) may receive, from the second UE, an indication of a full duplex Tx-Rx beam pair selection from the candidate full duplex Tx-Rx beam pairs, as described above.

Process 1200 may include additional aspects, such as any single aspect or any combination of aspects described below and/or in connection with one or more other processes described elsewhere herein.

In a first aspect, process 1200 includes transmitting, to the second UE, a sidelink transmission based at least in part on the indication of the full duplex Tx-Rx beam pair selection, wherein the sidelink transmission is associated with a sidelink mode 2, and the first UE and the second UE are not under active network control based at least in part on the sidelink mode 2.

In a second aspect, alone or in combination with the first aspect, the reference signals are preconfigured reference signals being used as dedicated reference signals for self-interference measurements, or the reference signals are dedicated reference signals for self-interference measurements.

In a third aspect, alone or in combination with one or more of the first and second aspects, process 1200 includes transmitting, to the second UE, a request for Tx beams associated with the first UE that satisfy a threshold, and receiving, from the second UE and based at least in part on the request, a report that indicates the Tx beams associated with the first UE, wherein the Tx beams associated with the first UE satisfy the threshold.

In a fourth aspect, alone or in combination with one or more of the first through third aspects, referencing signal transmission resources are reserved for transmitting the reference signals using the Tx beams of the first UE, and the reference signal transmission resources are reserved based at least in part on a resource reservation announcement by the first UE.

In a fifth aspect, alone or in combination with one or more of the first through fourth aspects, the candidate full duplex Tx-Rx beam pairs include one or more Tx-Rx beam pairs and one or more Tx-Rx beam set pairs, wherein a Tx-Rx beam set pair of the one or more Tx-Rx beam set pairs includes one or more Tx beams and one or more Rx beams.

In a sixth aspect, alone or in combination with one or more of the first through fifth aspects, the full duplex Tx-Rx beam pair selection is based at least in part on a metric calculated for the first UE and a metric calculated for the second UE, and the reference signals are associated with self-interference measurements by the first UE and reference signal measurements by the second UE.

In a seventh aspect, alone or in combination with one or more of the first through sixth aspects, process 1200 includes: transmitting, to the second UE, a request for Tx beams associated with the first UE that satisfy a threshold; receiving, from the second UE, a request for Tx beams associated with the second UE that satisfy the threshold; receiving, from the second UE, a beam report that indicates the Tx beams associated with the first UE that satisfy the threshold; transmitting, to the second UE, a beam report that indicates the Tx beams associated with the second UE that satisfy the threshold; selecting the Tx beams for the self-interference measurements; transmitting, to the second UE, an indication of a first UE Tx beam sweeping set; receiving, from the second UE, an indication of a second UE Tx beam sweeping set; selecting receive (Rx) beams for the self-interference measurements; and transmitting, to the second UE, an announcement of a reference signal resource reservation for the self-interference measurements.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
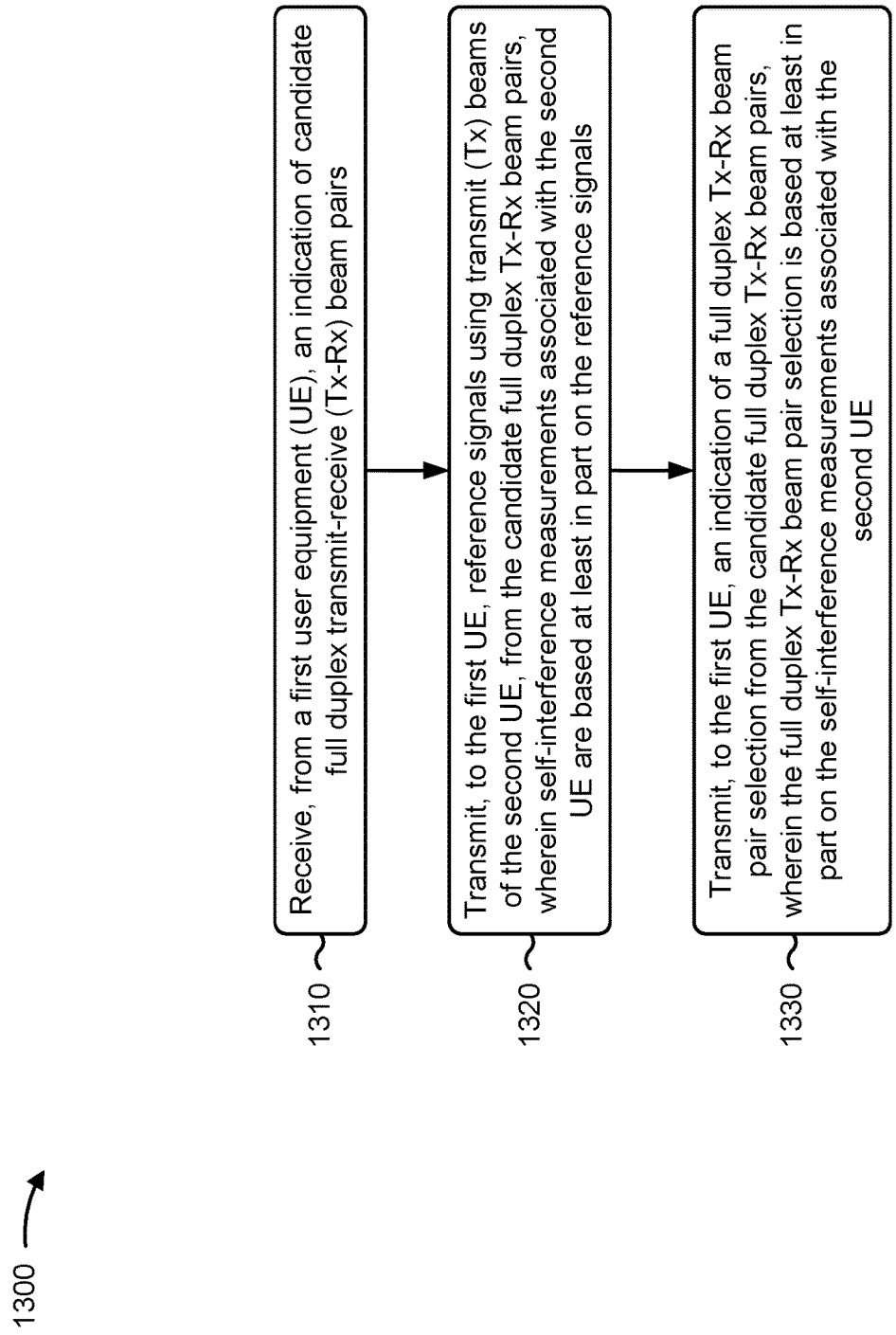

FIG. 13 is a diagram illustrating an example process 1300 performed, for example, by a second UE, in accordance with the present disclosure. Example process 1300 is an example where the second UE (e.g., UE 120*e*) performs operations associated with full duplex beam pair selection for sidelink communications.

As shown in FIG. 13, in some aspects, process 1300 may include receiving, from a first UE, an indication of candidate full duplex Tx-Rx beam pairs (block 1310).

Figure 15:
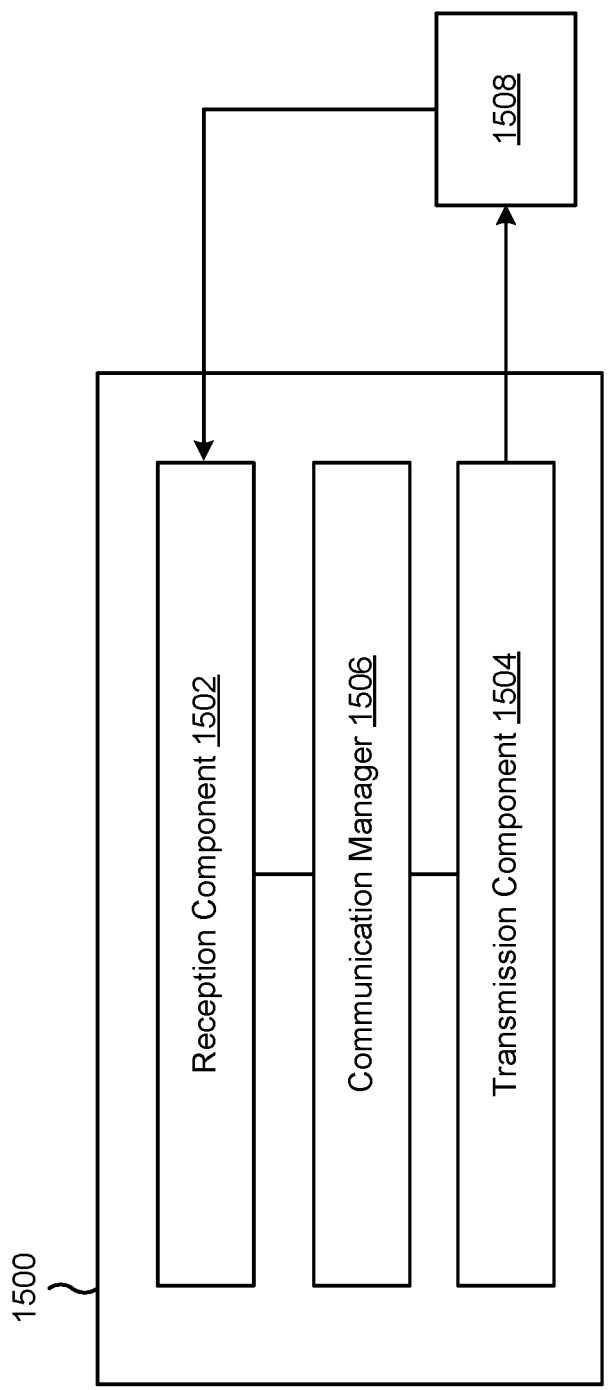

For example, the second UE (e.g., using reception component 1502 and/or communication manager 1506, depicted in FIG. 15) may receive, from a first UE, an indication of candidate full duplex Tx-Rx beam pairs, as described above.

As further shown in FIG. 13, in some aspects, process 1300 may include transmitting, to the first UE, reference signals using Tx beams of the second UE, from the candidate full duplex Tx-Rx beam pairs, wherein self-interference measurements associated with the second UE are based at least in part on the reference signals (block 1320). For example, the second UE (e.g., using transmission component 1504 and/or communication manager 1506, depicted in FIG. 15) may transmit, to the first UE, reference signals using Tx beams of the second UE, from the candidate full duplex Tx-Rx beam pairs, wherein self-interference measurements associated with the second UE are based at least in part on the reference signals, as described above.

As further shown in FIG. 13, in some aspects, process 1300 may include transmitting, to the first UE, an indication of a full duplex Tx-Rx beam pair selection from the candidate full duplex Tx-Rx beam pairs, wherein the full duplex Tx-Rx beam pair selection is based at least in part on the self-interference measurements associated with the second UE (block 1330). For example, the second UE (e.g., using transmission component 1504 and/or communication manager 1506, depicted in FIG. 15) may transmit, to the first UE, an indication of a full duplex Tx-Rx beam pair selection from the candidate full duplex Tx-Rx beam pairs, wherein the full duplex Tx-Rx beam pair selection is based at least in part on the self-interference measurements associated with the second UE, as described above.

Process 1300 may include additional aspects, such as any single aspect or any combination of aspects described below and/or in connection with one or more other processes described elsewhere herein.

In a first aspect, process 1300 includes receiving, from the first UE, a sidelink transmission based at least in part on the indication of the full duplex Tx-Rx beam pair selection, wherein the sidelink transmission is associated with a sidelink mode 2, and the first UE and the second UE are not under active network control based at least in part on the sidelink mode 2.

In a second aspect, alone or in combination with the first aspect, the reference signals are preconfigured reference signals being used as dedicated reference signals for self-interference measurements, or the reference signals are dedicated reference signals for self-interference measurements.

In a third aspect, alone or in combination with one or more of the first and second aspects, process 1300 includes receiving, from the first UE, a request for Tx beams associated with the first UE that satisfy a threshold, and transmitting, to the first UE and based at least in part on the request, a report that indicates Tx beams associated with the first UE that satisfy the threshold.

In a fourth aspect, alone or in combination with one or more of the first through third aspects, reference signal transmission resources are reserved for transmitting the reference signals using the Tx beams of the second UE, the Tx beams of the second UE are indicated in the candidate full duplex Tx-Rx beam pairs, the candidate full duplex Tx-Rx beam pairs include one or more Tx-Rx beam pairs and one or more Tx-Rx beam set pairs, and a Tx-Rx beam set pair of the one or more Tx-Rx beam set pairs includes one or more Tx beams and one or more Rx beams.

In a fifth aspect, alone or in combination with one or more of the first through fourth aspects, process 1300 includes receiving, from the first UE, a request for Tx beams associated with the first UE that satisfy a threshold; transmitting, to the first UE, a request for Tx beams associated with the second UE that satisfy the threshold; transmitting, to the first UE, a beam report that indicates the Tx beams associated with the first UE that satisfy the threshold; receiving, from the first UE, a beam report that indicates the Tx beams associated with the second UE that satisfy the threshold; selecting the Tx beams for the self-interference measurements; receiving, from the first UE, an indication of a first UE Tx beam sweeping set; transmitting, to the first UE, an indication of a second UE Tx beam sweeping set; selecting receive (Rx) beams for the self-interference measurements; and transmitting, to the first UE, an announcement of a reference signal resource reservation for the self-interference measurements.

In a sixth aspect, alone or in combination with one or more of the first through fifth aspects, the Tx beams of the reference signals are a random subset or a fixed subset of the candidate full duplex Tx-Rx beam pairs indicated by the first UE, or wherein some Tx beams correspond to the candidate full duplex Tx-Rx beam pairs and other Tx beams are selected outside of the candidate full duplex Tx-Rx pairs, or wherein the Tx beams are selected outside of the candidate full duplex Tx-Rx pairs.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
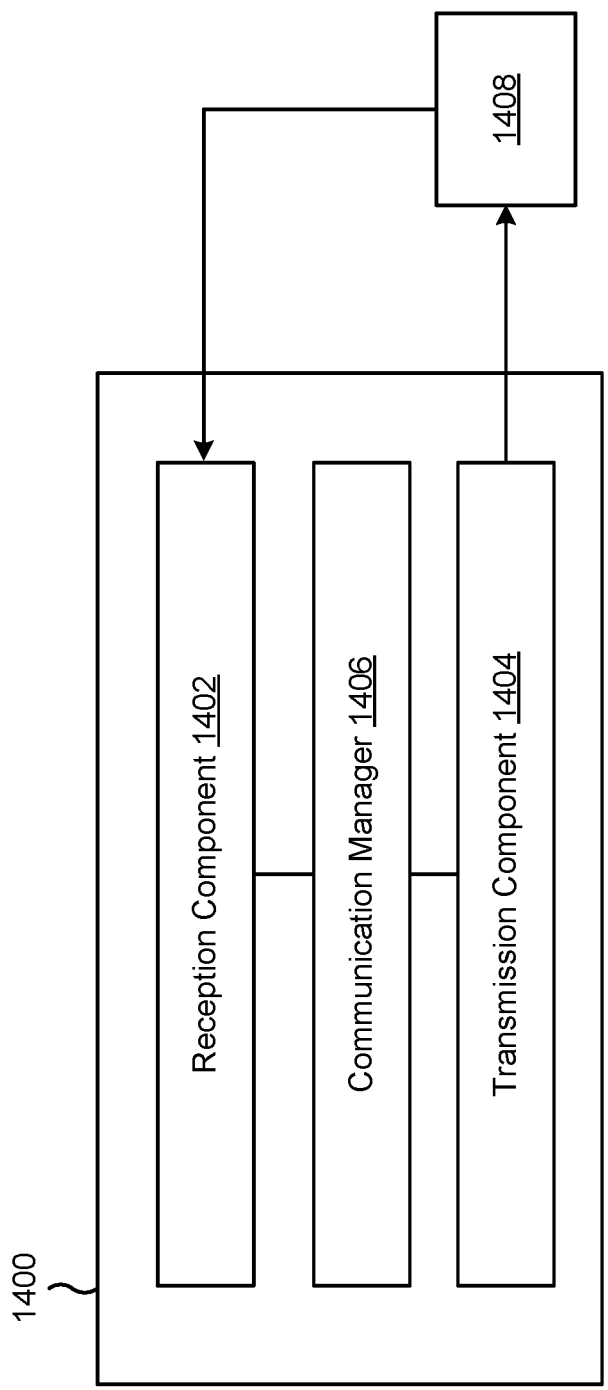
FIGS. 14-15 are diagrams of example apparatuses for wireless communication, in accordance with the present disclosure.

FIG. 14 is a diagram of an example apparatus 1400 for wireless communication, in accordance with the present disclosure. The apparatus 1400 may be a first UE, or a first UE may include the apparatus 1400. In some aspects, the apparatus 1400 includes a reception component 1402, a transmission component 1404, and/or a communication manager 1406, which may be in communication with one another (for example, via one or more buses and/or one or more other components). In some aspects, the communication manager 1406 is the communication manager 140 described in connection with FIG. 1. As shown, the apparatus 1400 may communicate with another apparatus 1408, such as a UE or a network node (such as a CU, a DU, an RU, or a base station), using the reception component 1402 and the transmission component 1404.

In some aspects, the apparatus 1400 may be configured to perform one or more operations described herein in connection with FIGS. 5-11. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the first UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the first UE described in connection with FIG. 2.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more antennas, a modem, a modulator, a transmit MIMO processor, a transmit processor, a controller/processor, a memory, or a combination thereof, of the first UE described in connection with FIG. 2. In some aspects, the transmission component 1404 may be co-located with the reception component 1402 in a transceiver.

The communication manager 1406 may support operations of the reception component 1402 and/or the transmission component 1404. For example, the communication manager 1406 may receive information associated with configuring reception of communications by the reception component 1402 and/or transmission of communications by the transmission component 1404. Additionally, or alternatively, the communication manager 1406 may generate and/or provide control information to the reception component 1402 and/or the transmission component 1404 to control reception and/or transmission of communications.

The transmission component 1404 may transmit, to a second UE, reference signals using Tx beams of the first UE based at least in part on a Tx beam sweeping, wherein self-interference measurements associated with the first UE are based at least in part on the reference signals. The transmission component 1404 may transmit, to the second UE, an indication of candidate full duplex Tx-Rx beam pairs, wherein the candidate full duplex Tx-Rx beam pairs are based at least in part on the self-interference measurements. The reception component 1402 may receive, from the second UE, an indication of a full duplex Tx-Rx beam pair selection from the candidate full duplex Tx-Rx beam pairs.

The transmission component 1404 may transmit, to the second UE, a sidelink transmission based at least in part on the indication of the full duplex Tx-Rx beam pair selection, wherein the sidelink transmission is associated with a sidelink mode 2. The transmission component 1404 may transmit, to the second UE, a request for Tx beams associated with the first UE that satisfy a threshold. The reception component 1402 may receive, from the second UE and based at least in part on the request, a report that indicates the Tx beams associated with the first UE, wherein the Tx beams associated with the first UE satisfy the threshold.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

FIG. 15 is a diagram of an example apparatus 1500 for wireless communication, in accordance with the present disclosure. The apparatus 1500 may be a second UE, or a second UE may include the apparatus 1500. In some aspects, the apparatus 1500 includes a reception component 1502, a transmission component 1504, and/or a communication manager 1506, which may be in communication with one another (for example, via one or more buses and/or one or more other components). In some aspects, the communication manager 1506 is the communication manager 140 described in connection with FIG. 1. As shown, the apparatus 1500 may communicate with another apparatus 1508, such as a UE or a network node (such as a CU, a DU, an RU, or a base station), using the reception component 1502 and the transmission component 1504.

In some aspects, the apparatus 1500 may be configured to perform one or more operations described herein in connection with FIGS. 5-11. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the second UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1508. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the second UE described in connection with FIG. 2.

The transmission component 1504 may transmit communications, such as reference signals, control information, data communications, or a combination thereof, to the apparatus 1508. In some aspects, one or more other components of the apparatus 1500 may generate communications and may provide the generated communications to the transmission component 1504 for transmission to the apparatus 1508. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1504 may include one or more antennas, a modem, a modulator, a transmit MIMO processor, a transmit processor, a controller/processor, a memory, or a combination thereof, of the second UE described in connection with FIG. 2. In some aspects, the transmission component 1504 may be co-located with the reception component 1502 in a transceiver.

The communication manager 1506 may support operations of the reception component 1502 and/or the transmission component 1504. For example, the communication manager 1506 may receive information associated with configuring reception of communications by the reception component 1502 and/or transmission of communications by the transmission component 1504. Additionally, or alternatively, the communication manager 1506 may generate and/or provide control information to the reception component 1502 and/or the transmission component 1504 to control reception and/or transmission of communications.

The reception component 1502 may receive, from a first UE, an indication of candidate full duplex Tx-Rx beam pairs. The transmission component 1504 may transmit, to the first UE, reference signals using Tx beams of the second UE, from the candidate full duplex Tx-Rx beam pairs, wherein self-interference measurements associated with the second UE are based at least in part on the reference signals. The transmission component 1504 may transmit, to the first UE, an indication of a full duplex Tx-Rx beam pair selection from the candidate full duplex Tx-Rx beam pairs, wherein the full duplex Tx-Rx beam pair selection is based at least in part on the self-interference measurements associated with the second UE.

The reception component 1502 may receive, from the first UE, a sidelink transmission based at least in part on the indication of the full duplex Tx-Rx beam pair selection, wherein the sidelink transmission is associated with a sidelink mode 2. The reception component 1502 may receive, from the first UE, a request for Tx beams associated with the first UE that satisfy a threshold. The transmission component 1504 may transmit, to the first UE and based at least in part on the request, a report that indicates Tx beams associated with the first UE that satisfy the threshold.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
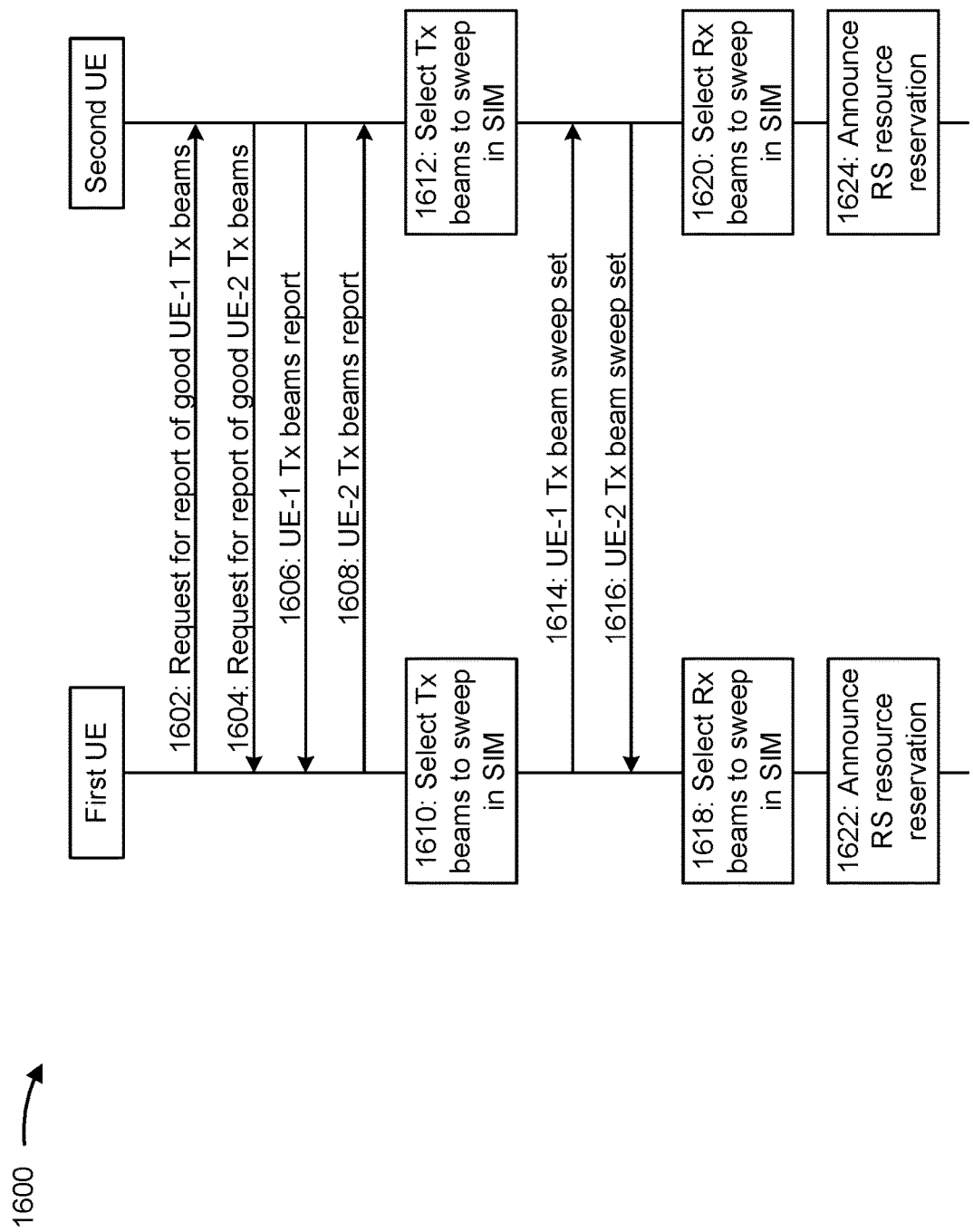
FIGS. 16-18 are diagrams illustrating examples associated with full duplex beam pair selection for sidelink communications, in accordance with the present disclosure.

FIG. 16 is a diagram illustrating an example 1600 associated with full duplex beam pair selection for sidelink communications, in accordance with the present disclosure. As shown in FIG. 16, example 1600 includes communication between a first UE (e.g., UE 120*a*) and a second UE (e.g., UE 120*e*). In some aspects, the first UE and the second UE may be included in a wireless network, such as wireless network 100. As shown by reference number 1602, the first UE may transmit, to the second UE, a request for a report of good first UE Tx beams. As shown by reference number 1602, the second UE may transmit, to the first UE, a request for a report of good second UE Tx beams. As shown by reference number 1606, the second UE may transmit, to the first UE and based at least in part on the request, a good first UE Tx beams report. As shown by reference number 1608, the first UE may transmit, to the second UE and based at least in part on the request, a good second UE Tx beams report. As shown by reference number 1610, the first UE may select Tx beams to sweep in self-interference measurements, which may be based at least in part on the good first UE Tx beams report. As shown by reference number 1612, the second UE may select Tx beams to sweep in self-interference measurements, which may be based at least in part on the good second UE Tx beams report. As shown by reference number 1614, the first UE may transmit, to the second UE, a first UE Tx beam sweep set. As shown by reference number 1616, the second UE may transmit, to the first UE, a second UE Tx beam sweep set.

As shown by reference number 1618, the first UE may select Rx beams to sweep in self-interference measurements, which may be based at least in part on the second UE Tx beam sweep set. As shown by reference number 1620, the second UE may select Rx beams to sweep in self-interference measurements, which may be based at least in part on the first UE Tx beam sweep set. As shown by reference number 1622, the first UE may announce a reference signal resource reservation for reference signal and data transmissions associated with the selected Tx beams and/or the selected Rx beams, where the reference signal and data transmissions may be for the purpose of self-interference measurements. As shown by reference number 1624, the second UE may announce a reference signal resource reservation for reference signal and data transmissions associated with the selected Tx beams and/or the selected Rx beams, where the reference signal and data transmissions may be for the purpose of self-interference measurements. In some aspects, the first UE and the second UE may perform an initial Tx and Rx beam selection to sweep during self-interference measurements.

As indicated above, FIG. 16 is provided as an example. Other examples may differ from what is described with regard to FIG. 16.

Figure 17:
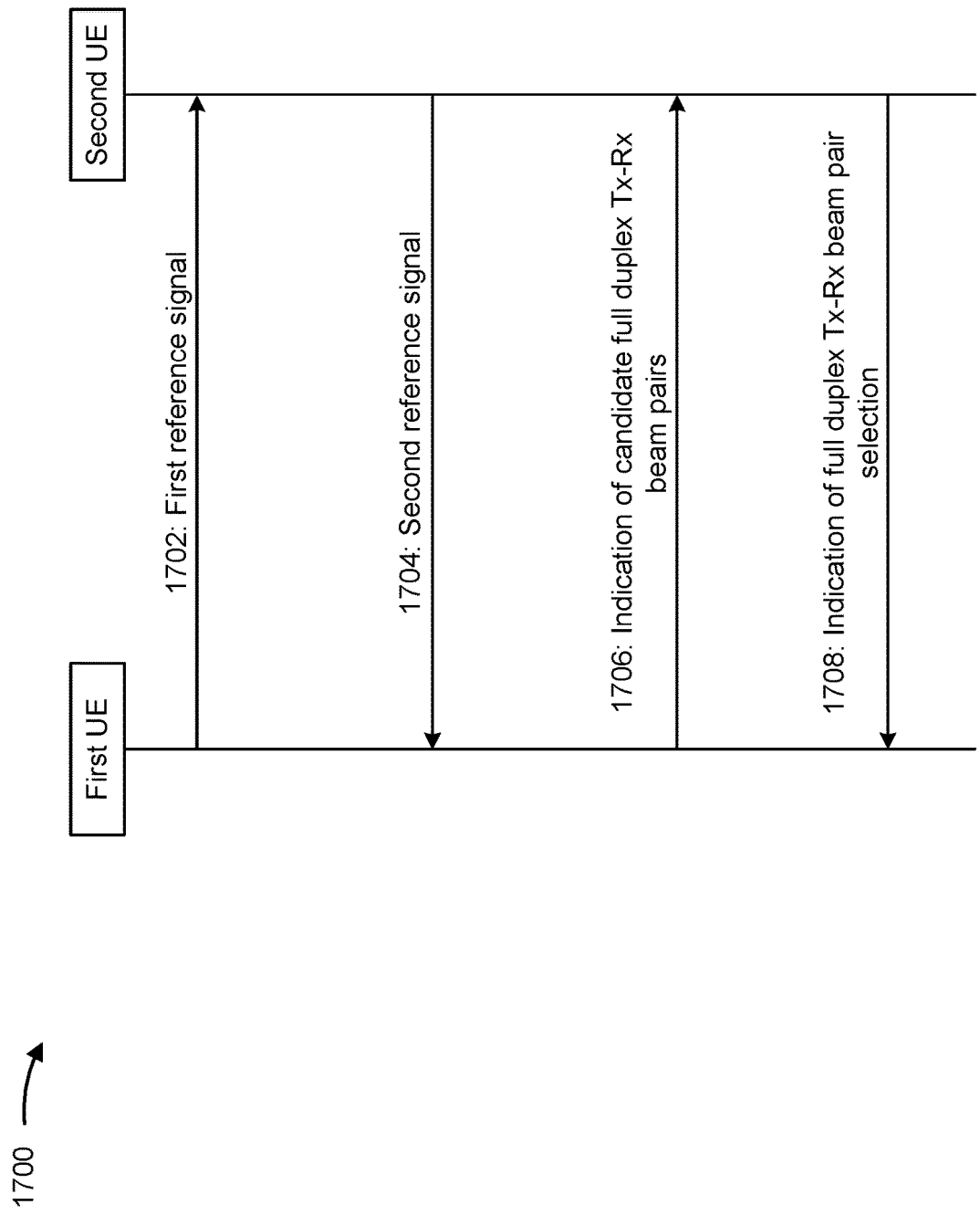

FIG. 17 is a diagram illustrating an example 1700 associated with full duplex beam pair selection for sidelink communications, in accordance with the present disclosure. As shown in FIG. 17, example 1700 includes communication between a first UE (e.g., UE 120*a*) and a second UE (e.g., UE 120*e*). In some aspects, the first UE and the second UE may be included in a wireless network, such as wireless network 100.

As shown by reference number 1702, the first UE may transmit, to the second UE, a first reference signal. The second UE may receive the first reference signal from the first UE. As shown by reference number 1704, the second UE may transmit, to the first UE, a second reference signal. The first UE may receive the second reference signal from the first UE. As shown by reference number 1706, the first UE may transmit, to the second UE, an indication of candidate full duplex Tx-Rx beam pairs, where the candidate full duplex Tx-Rx beam pairs may be based at least in part on the self-interference measurements. As shown by reference number 1708, the second UE may transmit, to the first UE, an indication of a full duplex Tx-Rx beam pair selection from the candidate full duplex Tx-Rx beam pairs, where the full duplex Tx-Rx beam pair selection may be based at least in part on the self-interference measurements associated with the second UE. In some aspects, reference signal transmissions may occur before the indications of the candidate full duplex Tx-Rx beam pairs and the full duplex Tx-Rx beam pair selection are transmitted.

As indicated above, FIG. 17 is provided as an example. Other examples may differ from what is described with regard to FIG. 17.

Figure 18:
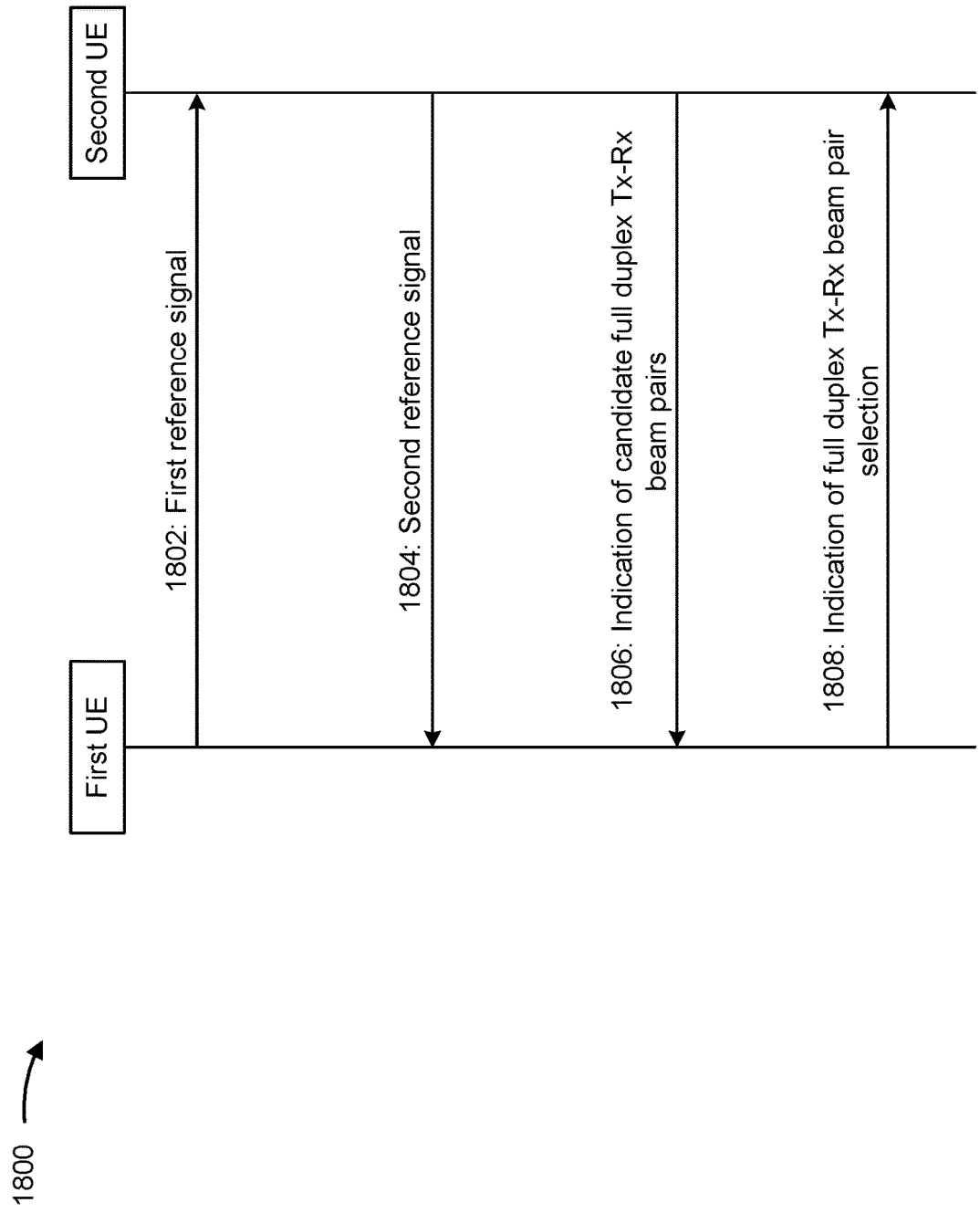

FIG. 18 is a diagram illustrating an example 1800 associated with full duplex beam pair selection for sidelink communications, in accordance with the present disclosure. As shown in FIG. 18, example 1800 includes communication between a first UE (e.g., UE 120*a*) and a second UE (e.g., UE 120*e*). In some aspects, the first UE and the second UE may be included in a wireless network, such as wireless network 100.

As shown by reference number 1802, the first UE may transmit, to the second UE, a first reference signal. The second UE may receive the first reference signal from the first UE. As shown by reference number 1804, the second UE may transmit, to the first UE, a second reference signal. The first UE may receive the second reference signal from the first UE. As shown by reference number 1806, the second UE may transmit, to the first UE, an indication of candidate full duplex Tx-Rx beam pairs, where the candidate full duplex Tx-Rx beam pairs may be based at least in part on the self-interference measurements. As shown by reference number 1808, the first UE may transmit, to the second UE, an indication of a full duplex Tx-Rx beam pair selection from the candidate full duplex Tx-Rx beam pairs, where the full duplex Tx-Rx beam pair selection may be based at least in part on the self-interference measurements associated with the first UE. In some aspects, the second UE may transmit the indication of candidate full duplex Tx-Rx beam pairs, instead of the first UE, when parallel self-interference measurements are employed by the first UE and the second UE instead of sequential self-interference measurements. In other words, when parallel sequential self-interference measurements are employed, the second UE may transmit the indication of candidate full duplex Tx-Rx beam pairs and the first UE may perform the full duplex Tx-Rx beam pair selection from the candidate full duplex Tx-Rx beam pairs (which may be opposite as compared to when the self-interference measurements are performed in a sequential manner).

As indicated above, FIG. 18 is provided as an example. Other examples may differ from what is described with regard to FIG. 18.

The following provides an overview of some Aspects of the present disclosure:

Aspect 1: A method of wireless communication performed by a first user equipment (UE), comprising: transmitting, to a second UE, reference signals using transmit (Tx) beams of the first UE based at least in part on a Tx beam sweeping, wherein self-interference measurements associated with the first UE are based at least in part on the reference signals; transmitting, to the second UE, an indication of candidate full duplex transmit-receive (Tx-Rx) beam pairs, wherein the candidate full duplex Tx-Rx beam pairs are based at least in part on the self-interference measurements; and receiving, from the second UE, an indication of a full duplex Tx-Rx beam pair selection from the candidate full duplex Tx-Rx beam pairs.

Aspect 2: The method of Aspect 1, further comprising: transmitting, to the second UE, a sidelink transmission based at least in part on the indication of the full duplex Tx-Rx beam pair selection, wherein the sidelink transmission is associated with a sidelink mode 2, and wherein the first UE and the second UE are not under active network control based at least in part on the sidelink mode 2.

Aspect 3: The method of any of Aspects 1-2, wherein the reference signals are preconfigured reference signals being used as dedicated reference signals for self-interference measurements, or wherein the reference signals are dedicated reference signals for self-interference measurements.

Aspect 4: The method of any of Aspects 1-3, further comprising: transmitting, to the second UE, a request for Tx beams associated with the first UE that satisfy a threshold; and receiving, from the second UE and based at least in part on the request, a report that indicates the Tx beams associated with the first UE, wherein the Tx beams associated with the first UE satisfy the threshold.

Aspect 5: The method of any of Aspects 1-4, wherein reference signal transmission resources are reserved for transmitting the reference signals using the Tx beams of the first UE, and wherein the reference signal transmission resources are reserved based at least in part on a resource reservation announcement by the first UE.

Aspect 6: The method of any of Aspects 1-5, wherein the candidate full duplex Tx-Rx beam pairs include one or more Tx-Rx beam pairs and one or more Tx-Rx beam set pairs, wherein a Tx-Rx beam set pair of the one or more Tx-Rx beam set pairs includes one or more Tx beams and one or more receive (Rx) beams.

Aspect 7: The method of any of Aspects 1-6, wherein the full duplex Tx-Rx beam pair selection is based at least in part on a metric calculated for the first UE and a metric calculated for the second UE, and wherein the reference signals are associated with self-interference measurements by the first UE and reference signal measurements by the second UE.

Aspect 8: The method of any of Aspects 1-7, further comprising: transmitting, to the second UE, a request for Tx beams associated with the first UE that satisfy a threshold; receiving, from the second UE, a request for Tx beams associated with the second UE that satisfy the threshold; receiving, from the second UE, a beam report that indicates the Tx beams associated with the first UE that satisfy the threshold; transmitting, to the second UE, a beam report that indicates the Tx beams associated with the second UE that satisfy the threshold; selecting the Tx beams for the self-interference measurements; transmitting, to the second UE, an indication of a first UE Tx beam sweeping set; receiving, from the second UE, an indication of a second UE Tx beam sweeping set; selecting receive (Rx) beams for the self-interference measurements; and transmitting, to the second UE, an announcement of a reference signal resource reservation for the self-interference measurements.

Aspect 9: A method of wireless communication performed by a second user equipment (UE), comprising: receiving, from a first user equipment (UE), an indication of candidate full duplex transmit-receive (Tx-Rx) beam pairs; transmitting, to the first UE, reference signals using transmit (Tx) beams of the second UE, from the candidate full duplex Tx-Rx beam pairs, wherein self-interference measurements associated with the second UE are based at least in part on the reference signals; and transmitting, to the first UE, an indication of a full duplex Tx-Rx beam pair selection from the candidate full duplex Tx-Rx beam pairs, wherein the full duplex Tx-Rx beam pair selection is based at least in part on the self-interference measurements associated with the second UE.

Aspect 10: The method of Aspect 9, further comprising: receiving, from the first UE, a sidelink transmission based at least in part on the indication of the full duplex Tx-Rx beam pair selection, wherein the sidelink transmission is associated with a sidelink mode 2, and wherein the first UE and the second UE are not under active network control based at least in part on the sidelink mode 2.

Aspect 11: The method of any of Aspects 9-10, wherein the reference signals are preconfigured reference signals being used as dedicated reference signals for self-interference measurements, or wherein the reference signals are dedicated reference signals for self-interference measurements.

Aspect 12: The method of any of Aspects 9-11, further comprising: receiving, from the first UE, a request for Tx beams associated with the first UE that satisfy a threshold; and transmitting, to the first UE and based at least in part on the request, a report that indicates Tx beams associated with the first UE that satisfy the threshold.

Aspect 13: The method of any of Aspects 9-12, wherein reference signal transmission resources are reserved for transmitting the reference signals using the Tx beams of the second UE, wherein the Tx beams of the second UE are indicated in the candidate full duplex Tx-Rx beam pairs, wherein the candidate full duplex Tx-Rx beam pairs include one or more Tx-Rx beam pairs and one or more Tx-Rx beam set pairs, and wherein a Tx-Rx beam set pair of the one or more Tx-Rx beam set pairs includes one or more Tx beams and one or more receive (Rx) beams.

Aspect 14: The method of any of Aspects 9-13, further comprising: receiving, from the first UE, a request for Tx beams associated with the first UE that satisfy a threshold; transmitting, to the first UE, a request for Tx beams associated with the second UE that satisfy the threshold; transmitting, to the first UE, a beam report that indicates the Tx beams associated with the first UE that satisfy the threshold; receiving, from the first UE, a beam report that indicates the Tx beams associated with the second UE that satisfy the threshold; selecting the Tx beams for the self-interference measurements; receiving, from the first UE, an indication of a first UE Tx beam sweeping set; transmitting, to the first UE, an indication of a second UE Tx beam sweeping set; selecting receive (Rx) beams for the self-interference measurements; and transmitting, to the first UE, an announcement of a reference signal resource reservation for the self-interference measurements.

Aspect 15: The method of any of Aspects 9-14, wherein the Tx beams of the reference signals are a random subset or a fixed subset of the candidate full duplex Tx-Rx beam pairs indicated by the first UE, or wherein some Tx beams correspond to the candidate full duplex Tx-Rx beam pairs and other Tx beams are selected outside of the candidate full duplex Tx-Rx pairs, or wherein the Tx beams are selected outside of the candidate full duplex Tx-Rx pairs.

Aspect 16: An apparatus for wireless communication at a device, comprising a processor; memory coupled with the processor; and instructions stored in the memory and executable by the processor to cause the apparatus to perform the method of one or more of Aspects 1-8.

Aspect 17: A device for wireless communication, comprising a memory and one or more processors coupled to the memory, the one or more processors configured to perform the method of one or more of Aspects 1-8.

Aspect 18: An apparatus for wireless communication, comprising at least one means for performing the method of one or more of Aspects 1-8.

Aspect 19: A non-transitory computer-readable medium storing code for wireless communication, the code comprising instructions executable by a processor to perform the method of one or more of Aspects 1-8.

Aspect 20: A non-transitory computer-readable medium storing a set of instructions for wireless communication, the set of instructions comprising one or more instructions that, when executed by one or more processors of a device, cause the device to perform the method of one or more of Aspects 1-8.

Aspect 21: An apparatus for wireless communication at a device, comprising a processor; memory coupled with the processor; and instructions stored in the memory and executable by the processor to cause the apparatus to perform the method of one or more of Aspects 9-15.

Aspect 22: A device for wireless communication, comprising a memory and one or more processors coupled to the memory, the one or more processors configured to perform the method of one or more of Aspects 9-15.

Aspect 23: An apparatus for wireless communication, comprising at least one means for performing the method of one or more of Aspects 9-15.

Aspect 24: A non-transitory computer-readable medium storing code for wireless communication, the code comprising instructions executable by a processor to perform the method of one or more of Aspects 9-15.

Aspect 25: A non-transitory computer-readable medium storing a set of instructions for wireless communication, the set of instructions comprising one or more instructions that, when executed by one or more processors of a device, cause the device to perform the method of one or more of Aspects 9-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   a memory; and
   one or more processors coupled to the memory, the memory including instructions executable by the one or more processors to cause the first UE to:
   transmit, to a second UE, reference signals using transmit (Tx) beams of the first UE based at least in part on a Tx beam sweeping, wherein self-interference measurements associated with the first UE are based at least in part on the reference signals;
   transmit, to the second UE, an indication of candidate full duplex transmit-receive (Tx-Rx) beam pairs, wherein the candidate full duplex Tx-Rx beam pairs are based at least in part on the self-interference measurements; and
   receive, from the second UE, an indication of a full duplex Tx-Rx beam pair selection from the candidate full duplex Tx-Rx beam pairs.

2. The first UE of claim 1,
   wherein the memory further includes instructions executable by the one or more processors to cause the first UE to:
   transmit, to the second UE, a sidelink transmission based at least in part on the indication of the full duplex Tx-Rx beam pair selection, wherein the sidelink transmission is associated with a sidelink mode 2, and wherein the first UE and the second UE are not under active network control based at least in part on the sidelink mode 2.

3. The first UE of claim 1,
wherein the reference signals are preconfigured reference signals being used as dedicated reference signals for self-interference measurements, or wherein the reference signals are dedicated reference signals for self-interference measurements.

4. The first UE of claim 1,
wherein the memory further includes instructions executable by the one or more processors to cause the first UE to:
transmit, to the second UE, a request for Tx beams associated with the first UE that satisfy a threshold; and
receive, from the second UE and based at least in part on the request, a report that indicates the Tx beams associated with the first UE, wherein the Tx beams associated with the first UE satisfy the threshold.

5. The first UE of claim 1,
wherein reference signal transmission resources are reserved for transmitting the reference signals using the Tx beams of the first UE, and wherein the reference signal transmission resources are reserved based at least in part on a resource reservation announcement by the first UE.

6. The first UE of claim 1,
wherein the candidate full duplex Tx-Rx beam pairs include one or more Tx-Rx beam pairs and one or more Tx-Rx beam set pairs, wherein a Tx-Rx beam set pair of the one or more Tx-Rx beam set pairs includes one or more Tx beams and one or more receive (Rx) beams.

7. The first UE of claim 1,
wherein the full duplex Tx-Rx beam pair selection is based at least in part on a metric calculated for the first UE and a metric calculated for the second UE, and wherein the reference signals are associated with self-interference measurements by the first UE and reference signal measurements by the second UE.

8. The first UE of claim 1,
wherein the memory further includes instructions executable by the one or more processors to cause the first UE to:
transmit, to the second UE, a request for Tx beams associated with the first UE that satisfy a threshold;
receive, from the second UE, a request for Tx beams associated with the second UE that satisfy the threshold;
receive, from the second UE, a beam report that indicates the Tx beams associated with the first UE that satisfy the threshold;
transmit, to the second UE, a beam report that indicates the Tx beams associated with the second UE that satisfy the threshold;
select the Tx beams for the self-interference measurements;
transmit, to the second UE, an indication of a first UE Tx beam sweeping set;
receive, from the second UE, an indication of a second UE Tx beam sweeping set;
select receive (Rx) beams for the self-interference measurements; and
transmit, to the second UE, an announcement of a reference signal resource reservation for the self-interference measurements.

9. A second user equipment (UE) for wireless communication, comprising:
a memory; and
one or more processors coupled to the memory, the memory including instructions executable by the one or more processors to cause the second UE to:
receive, from a first user equipment (UE), an indication of candidate full duplex transmit-receive (Tx-Rx) beam pairs;
transmit, to the first UE, reference signals using transmit (Tx) beams of the second UE, from the candidate full duplex Tx-Rx beam pairs, wherein self-interference measurements associated with the second UE are based at least in part on the reference signals; and
transmit, to the first UE, an indication of a full duplex Tx-Rx beam pair selection from the candidate full duplex Tx-Rx beam pairs, wherein the full duplex Tx-Rx beam pair selection is based at least in part on the self-interference measurements associated with the second UE.

10. The second UE of claim 9,
wherein the memory further includes instructions executable by the one or more processors to cause the second UE to:
receive, from the first UE, a sidelink transmission based at least in part on the indication of the full duplex Tx-Rx beam pair selection, wherein the sidelink transmission is associated with a sidelink mode 2, and wherein the first UE and the second UE are not under active network control based at least in part on the sidelink mode 2.

11. The second UE of claim 9,
wherein the reference signals are preconfigured reference signals being used as dedicated reference signals for self-interference measurements, or wherein the reference signals are dedicated reference signals for self-interference measurements.

12. The second UE of claim 9,
wherein the memory further includes instructions executable by the one or more processors to cause the second UE to:
receive, from the first UE, a request for Tx beams associated with the first UE that satisfy a threshold; and
transmit, to the first UE and based at least in part on the request, a report that indicates Tx beams associated with the first UE that satisfy the threshold.

13. The second UE of claim 9,
wherein the candidate full duplex Tx-Rx beam pairs include one or more Tx-Rx beam pairs and one or more Tx-Rx beam set pairs, wherein a Tx-Rx beam set pair of the one or more Tx-Rx beam set pairs includes one or more Tx beams and one or more receive (Rx) beams, wherein reference signal transmission resources are reserved for transmitting the reference signals using the Tx beams of the second UE, and wherein the Tx beams of the second UE are indicated in the candidate full duplex Tx-Rx beam pairs.

14. The second UE of claim 9,
wherein the memory further includes instructions executable by the one or more processors to cause the second UE to:
receive, from the first UE, a request for Tx beams associated with the first UE that satisfy a threshold;

transmit, to the first UE, a request for Tx beams associated with the second UE that satisfy the threshold;
transmit, to the first UE, a beam report that indicates the Tx beams associated with the first UE that satisfy the threshold;
receive, from the first UE, a beam report that indicates the Tx beams associated with the second UE that satisfy the threshold;
select the Tx beams for the self-interference measurements;
receive, from the first UE, an indication of a first UE Tx beam sweeping set;
transmit, to the first UE, an indication of a second UE Tx beam sweeping set;
select receive (Rx) beams for the self-interference measurements; and
transmit, to the first UE, an announcement of a reference signal resource reservation for the self-interference measurements.

15. The second UE of claim 9,
wherein the Tx beams of the reference signals are a random subset or a fixed subset of the candidate full duplex Tx-Rx beam pairs indicated by the first UE, or wherein some Tx beams correspond to the candidate full duplex Tx-Rx beam pairs and other Tx beams are selected outside of the candidate full duplex Tx-Rx pairs, or wherein the Tx beams are selected outside of the candidate full duplex Tx-Rx pairs.

16. A method of wireless communication performed by a first user equipment (UE), comprising:
transmitting, to a second UE, reference signals using transmit (Tx) beams of the first UE based at least in part on a Tx beam sweeping, wherein self-interference measurements associated with the first UE are based at least in part on the reference signals;
transmitting, to the second UE, an indication of candidate full duplex transmit-receive (Tx-Rx) beam pairs, wherein the candidate full duplex Tx-Rx beam pairs are based at least in part on the self-interference measurements; and
receiving, from the second UE, an indication of a full duplex Tx-Rx beam pair selection from the candidate full duplex Tx-Rx beam pairs.

17. The method of claim 16, further comprising:
transmitting, to the second UE, a sidelink transmission based at least in part on the indication of the full duplex Tx-Rx beam pair selection, wherein the sidelink transmission is associated with a sidelink mode 2, and wherein the first UE and the second UE are not under active network control based at least in part on the sidelink mode 2.

18. The method of claim 16,
wherein the reference signals are preconfigured reference signals being used as dedicated reference signals for self-interference measurements, or wherein the reference signals are dedicated reference signals for self-interference measurements.

19. The method of claim 16, further comprising:
transmitting, to the second UE, a request for Tx beams associated with the first UE that satisfy a threshold; and
receiving, from the second UE and based at least in part on the request, a report that indicates the Tx beams associated with the first UE, wherein the Tx beams associated with the first UE satisfy the threshold.

20. The method of claim 16,
wherein reference signal transmission resources are reserved for transmitting the reference signals using the Tx beams of the first UE, and wherein the reference signal transmission resources are reserved based at least in part on a resource reservation announcement by the first UE.

21. The method of claim 16,
wherein the candidate full duplex Tx-Rx beam pairs include one or more Tx-Rx beam pairs and one or more Tx-Rx beam set pairs, wherein a Tx-Rx beam set pair of the one or more Tx-Rx beam set pairs includes one or more Tx beams and one or more receive (Rx) beams.

22. The method of claim 16,
wherein the full duplex Tx-Rx beam pair selection is based at least in part on a metric calculated for the first UE and a metric calculated for the second UE, and wherein the reference signals are associated with self-interference measurements by the first UE and reference signal measurements by the second UE.

23. The method of claim 16, further comprising:
transmitting, to the second UE, a request for Tx beams associated with the first UE that satisfy a threshold;
receiving, from the second UE, a request for Tx beams associated with the second UE that satisfy the threshold;
receiving, from the second UE, a beam report that indicates the Tx beams associated with the first UE that satisfy the threshold;
transmitting, to the second UE, a beam report that indicates the Tx beams associated with the second UE that satisfy the threshold;
selecting the Tx beams for the self-interference measurements;
transmitting, to the second UE, an indication of a first UE Tx beam sweeping set;
receiving, from the second UE, an indication of a second UE Tx beam sweeping set;
selecting receive (Rx) beams for the self-interference measurements; and
transmitting, to the second UE, an announcement of a reference signal resource reservation for the self-interference measurements.

24. A method of wireless communication performed by a second user equipment (UE), comprising:
receiving, from a first user equipment (UE), an indication of candidate full duplex transmit-receive (Tx-Rx) beam pairs;
transmitting, to the first UE, reference signals using transmit (Tx) beams of the second UE, from the candidate full duplex Tx-Rx beam pairs, wherein self-interference measurements associated with the second UE are based at least in part on the reference signals; and
transmitting, to the first UE, an indication of a full duplex Tx-Rx beam pair selection from the candidate full duplex Tx-Rx beam pairs, wherein the full duplex Tx-Rx beam pair selection is based at least in part on the self-interference measurements associated with the second UE.

25. The method of claim 24, further comprising:
receiving, from the first UE, a sidelink transmission based at least in part on the indication of the full duplex Tx-Rx beam pair selection, wherein the sidelink transmission is associated with a sidelink mode 2, and wherein the first UE and the second UE are not under active network control based at least in part on the sidelink mode 2.

26. The method of claim 24,
wherein the reference signals are preconfigured reference signals being used as dedicated reference signals for self-interference measurements, or wherein the reference signals are dedicated reference signals for self-interference measurements.

27. The method of claim 24, further comprising:
receiving, from the first UE, a request for Tx beams associated with the first UE that satisfy a threshold; and
transmitting, to the first UE and based at least in part on the request, a report that indicates Tx beams associated with the first UE that satisfy the threshold.

28. The method of claim 24,
wherein reference signal transmission resources are reserved for transmitting the reference signals using the Tx beams of the second UE, and wherein the Tx beams of the second UE are indicated in the candidate full duplex Tx-Rx beam pairs, wherein the candidate full duplex Tx-Rx beam pairs include one or more Tx-Rx beam pairs and one or more Tx-Rx beam set pairs, and wherein a Tx-Rx beam set pair of the one or more Tx-Rx beam set pairs includes one or more Tx beams and one or more receive (Rx) beams.

29. The method of claim 24, further comprising:
receiving, from the first UE, a request for Tx beams associated with the first UE that satisfy a threshold;
transmitting, to the first UE, a request for Tx beams associated with the second UE that satisfy the threshold;
transmitting, to the first UE, a beam report that indicates the Tx beams associated with the first UE that satisfy the threshold;
receiving, from the first UE, a beam report that indicates the Tx beams associated with the second UE that satisfy the threshold;
selecting the Tx beams for the self-interference measurements;
receiving, from the first UE, an indication of a first UE Tx beam sweeping set;
transmitting, to the first UE, an indication of a second UE Tx beam sweeping set;
selecting receive (Rx) beams for the self-interference measurements; and
transmitting, to the first UE, an announcement of a reference signal resource reservation for the self-interference measurements.

30. The method of claim 24,
wherein the Tx beams of the reference signals are a random subset or a fixed subset of the candidate full duplex Tx-Rx beam pairs indicated by the first UE, or wherein some Tx beams correspond to the candidate full duplex Tx-Rx beam pairs and other Tx beams are selected outside of the candidate full duplex Tx-Rx pairs, or wherein the Tx beams are selected outside of the candidate full duplex Tx-Rx pairs.

\* \* \* \* \*